Aug. 19, 1958  L. U. C. KELLING ET AL  2,848,670
AUTOMATIC PROGRAMMING SERVOMOTOR CONTROL SYSTEM
Filed Dec. 30, 1954  5 Sheets-Sheet 1
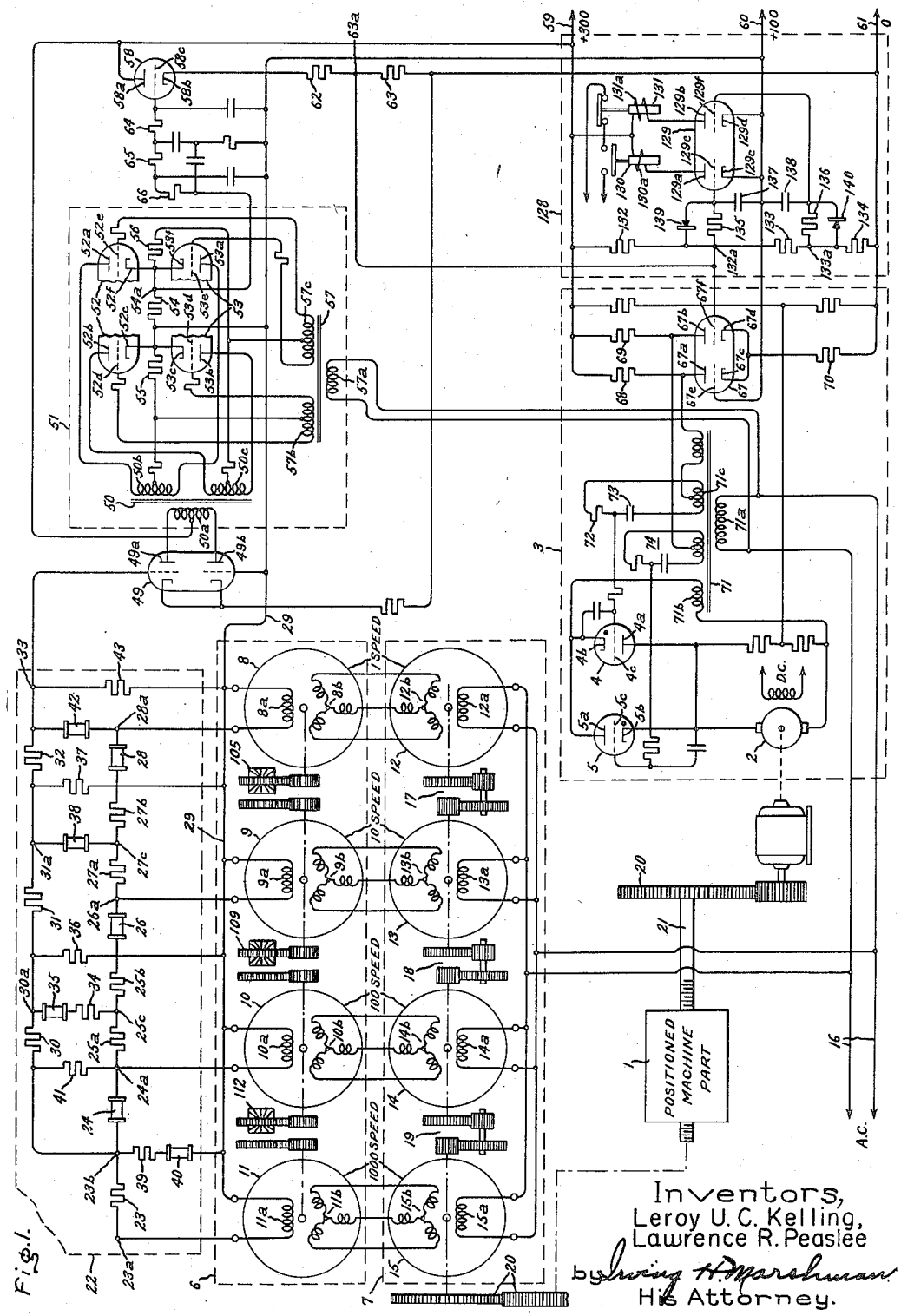
Inventors,
Leroy U. C. Kelling,
Lawrence R. Peaslee
by Irving H. Marshman
His Attorney.

Aug. 19, 1958    L. U. C. KELLING ET AL    2,848,670
AUTOMATIC PROGRAMMING SERVOMOTOR CONTROL SYSTEM
Filed Dec. 30, 1954                                 5 Sheets-Sheet 2
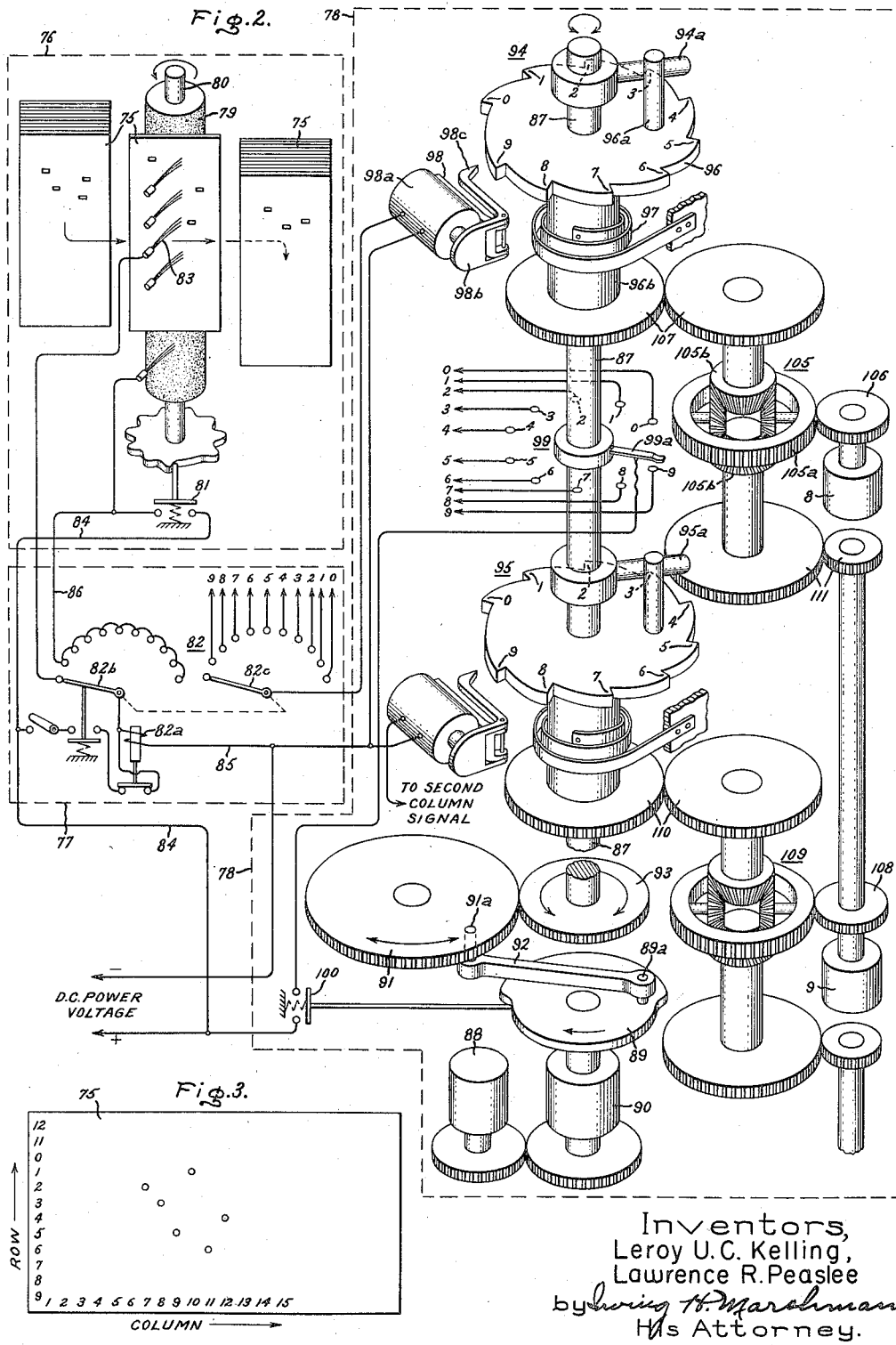
Inventors,
Leroy U.C. Kelling,
Lawrence R. Peaslee
by His Attorney.

Aug. 19, 1958     L. U. C. KELLING ET AL     2,848,670
AUTOMATIC PROGRAMMING SERVOMOTOR CONTROL SYSTEM
Filed Dec. 30, 1954     5 Sheets-Sheet 3
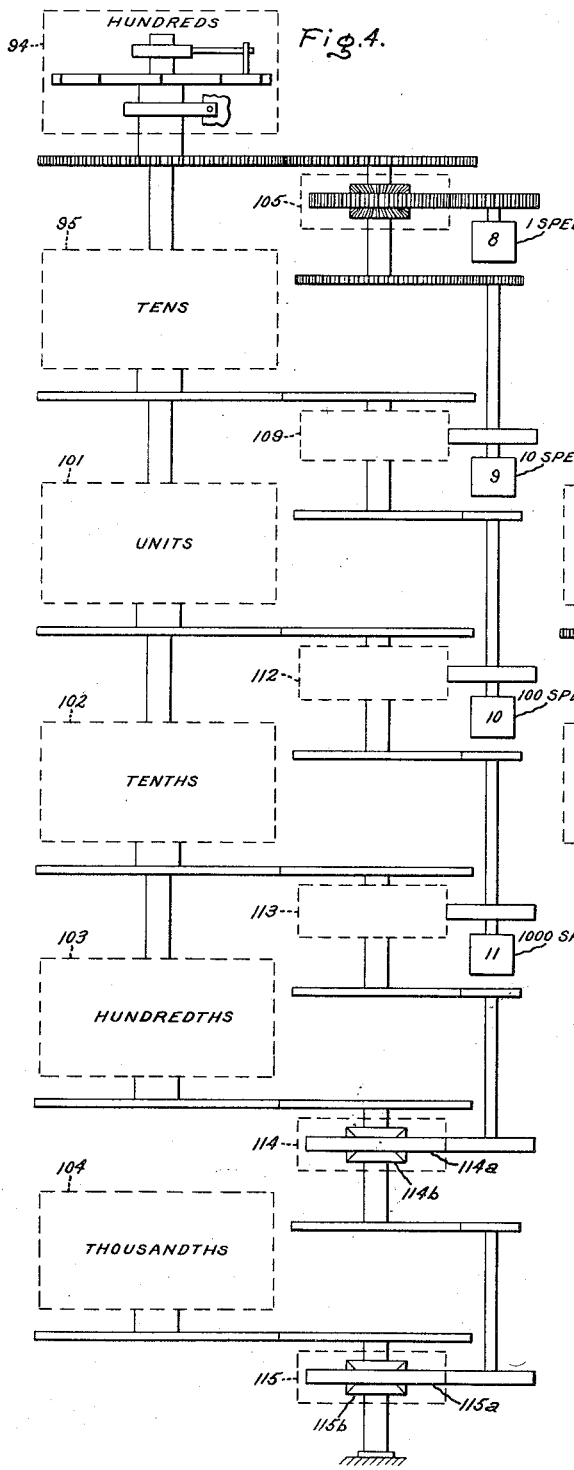
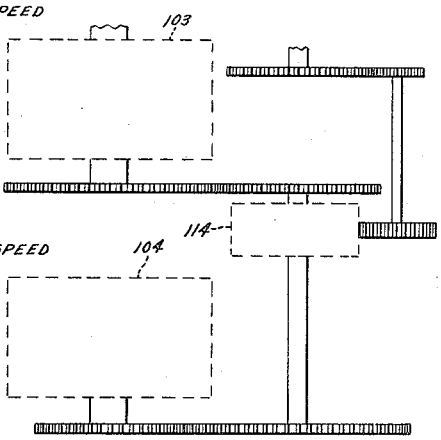
Inventors,
Leroy U.C. Kelling,
Lawrence R. Peaslee
by Irving H. Marshman
His Attorney.

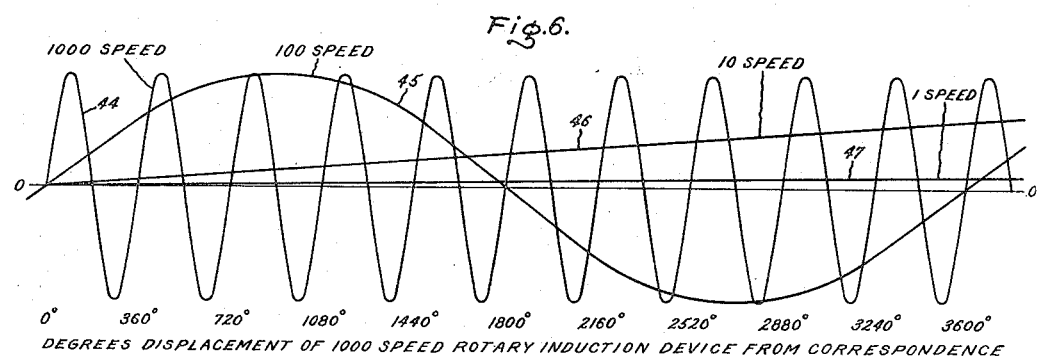
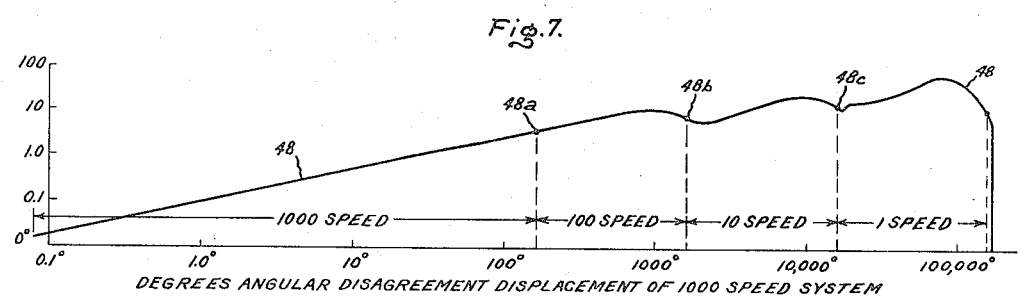
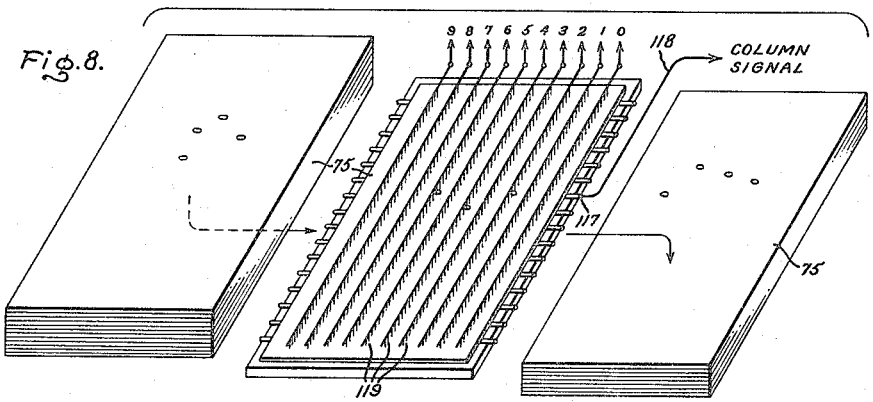
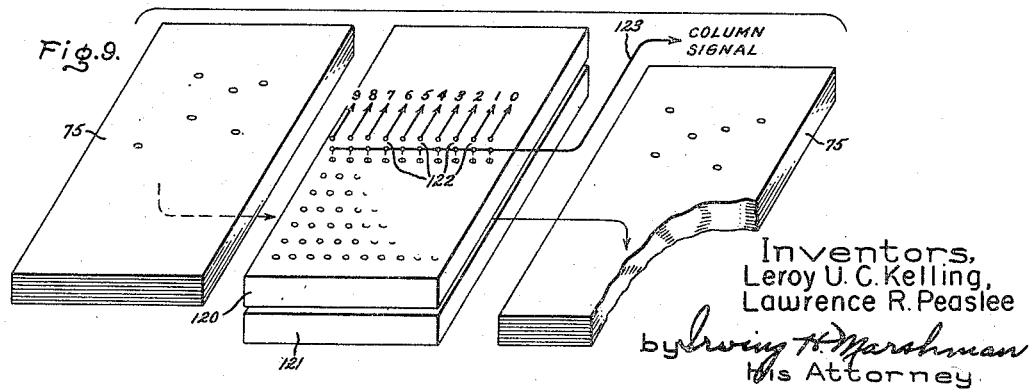

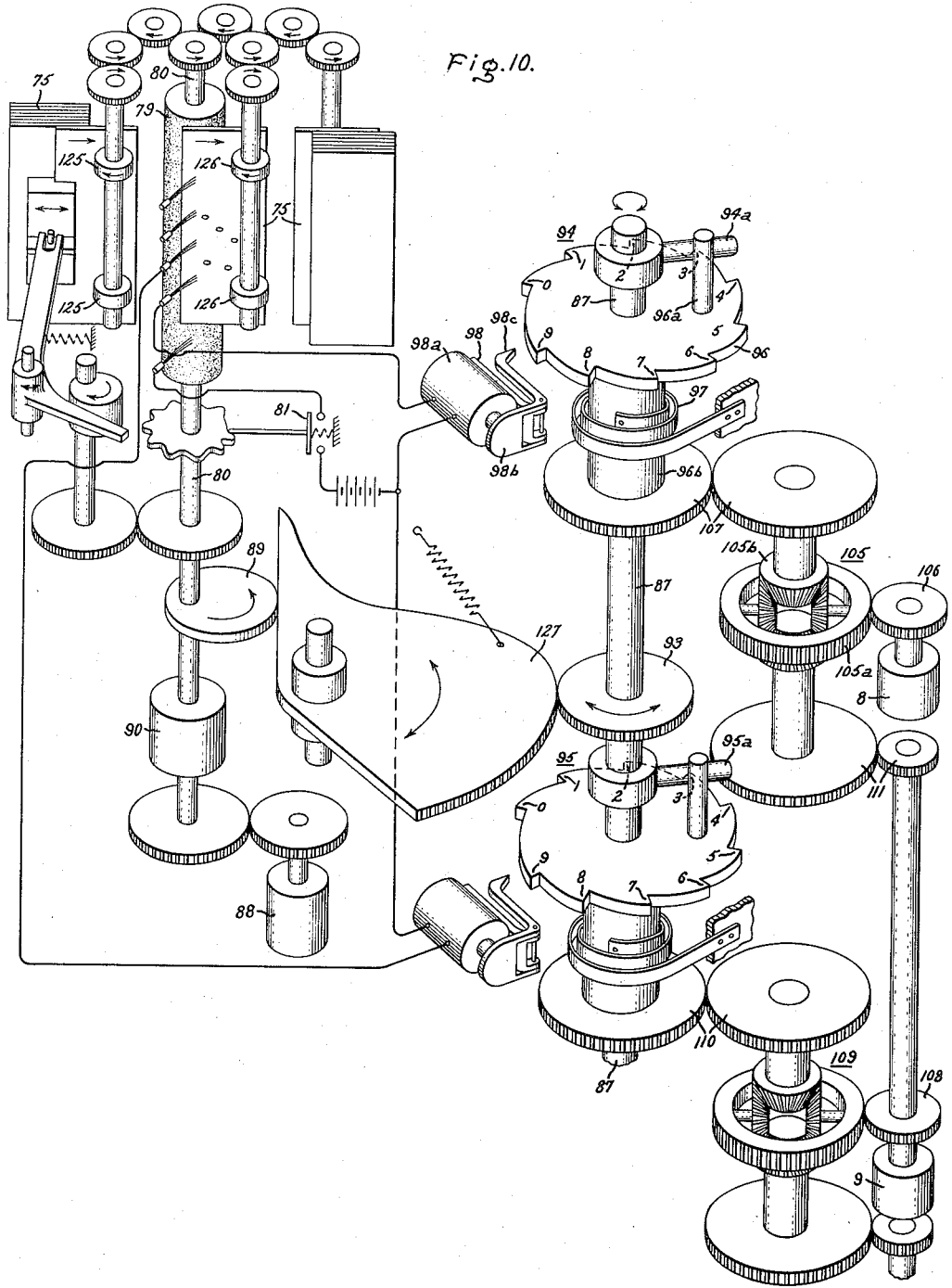

United States Patent Office 2,848,670
Patented Aug. 19, 1958

2,848,670

AUTOMATIC PROGRAMMING SERVOMOTOR
CONTROL SYSTEM

Leroy U. C. Kelling and Lawrence R. Peaslee, Schenectady, N. Y., assignors to General Electric Company, a corporation of New York Application December 30, 1954, Serial No. 478,632

27 Claims. (Cl. 318—30)

This invention relates to control systems, more particularly to intermittent programming control systems, and it has for an object the provision of a simple, reliable and improved control system of this character.

More specifically, the invention relates to intermittently operating programming control systems in which, in response to information recorded on a suitable data storage medium, an object such as a driven element of a machine tool is automatically driven to and stopped in each of a plurality of predetermined positions by means of a follow-up control system of which the follow-up drive motor is controlled by means of an electrical indication of the difference between the actual instantaneous position of such object and its desired position. This electrical indication is obtained by means of a director mechanism and a position indicator. Such director mechanism comprises a plurality of induction devices each having relatively movable members with primary and secondary windings mounted thereon. The position indicator comprises a plurality of corresponding or counterpart induction devices which are mechanically connected to the driven object so that the positions of their movable members are indicative of the position of such driven member, and a further object is the provision of means for rapidly and automatically presetting the movable members of the induction devices in the director in the precise positions required for positioning the driven object in each of the successive precise locations in which it is to be stopped.

Induction devices of the character described in the foregoing are frequently referred to by such terms as selsyns, synchros or control transformers. They may be either of the rotary or linear type. The rotary induction device is physically similar to a wound rotor induction motor in that it has a stator member and a rotor member upon one of which is mounted a primary winding and upon another of which is mounted a secondary winding. The linear induction device has relatively movable members, i. e., magnetic structures upon which are mounted primary and secondary windings. However, the magnetic structures of the linear device are developed in a straight line or plane instead of the cylindrical or drum forms of the rotary device. Consequently, the relative motion of the relatively movable members is straight line in contrast to the rotary motion of the rotary induction device. The rotary and linear induction devices are electrically similar and produce similar electrical characteristics and results. They may be used interchangeably in electrical control systems, although for certain applications one type may possess advantages over the other. Rotary induction devices lend themselves to relatively simple illustration, and consequently in the drawings and in the following specification, the director and position indicator are illustrated and described as comprising rotary induction devices.

In follow-up control systems of the character described in the foregoing, each of the plurality of rotary induction devices in the position indicator in cooperation with its counterpart in the director provides a different degree of refinement or preciseness of control of the positioning operation of the driven object. For example, a rather coarse control is provided by means of a rotary induction device which is connected to the driven object by means of gearing having a relatively low ratio e. g. a ratio which produces less than 180° rotation of its rotor member for the maximum movement of the driven object. It may conveniently be referred to as the 1-speed rotary induction device, which together with its counterpart in the director constitutes a 1-speed system. An added degree of accuracy of control is provided by a second rotary induction device which is connected to the driven object by gearing having a higher ratio such for example as a ratio which causes its rotor to turn 10 revolutions for each revolution of the 1-speed coarse control rotary induction device. It may conveniently be referred to as the 10-speed device and together with its counterpart in the director, it constitutes the 10-speed system. Still further refinement and increased accuracy of positioning control may be obtained by additional rotary induction devices connected to the driven object by gearing providing still higher ratios of rotation with respect to the 1-speed device e. g. 100:1 and 1,000:1, and they, together with their counterparts in the director are known as the 100-speed system and 1,000-speed system respectively. Since the phase of the output voltage of a rotary induction device reverses for each 180° of rotation, each should have control of the follow-up motor for less than 180° of its own rotation and accordingly suitable take-over means is provided for transferring the control from each higher speed system to the next lower speed system during departure from correspondence at some point in the first 180° of such departure of such higher speed system. Similarly, during return to correspondence, the take-over means transfers control of the follow-up motor from each lower speed system to the next higher speed system at some point in the last 180° of rotation of such higher speed system prior to arrival of the driven object at the precise desired position.

As stated in the foregoing, each rotary induction device in the position indicator which is geared to the driven object has a corresponding or counterpart rotary induction device in the director. During the actual controlled movement of the driven object, the rotors of the higher speed rotary induction devices in the position indicator will turn through a large number of revolutions, for example, the 1,000-speed device will turn 1,000 times for each turn or 500 times for each 180° rotation of the 1-speed device. In order that the driven object may be brought to rest in the precise desired location, it is necessary that the rotors of the induction devices in the director shall be preset to the corresponding exact angular positions at which the rotors of their counterpart devices in the position indicator will arrive at the exact instant of arrival of the driven object in the desired position.

It is desirable, however, from the point of view of reduction of operating time and other considerations that the higher speed rotary induction devices in the director shall not be required to turn through the same large number of revolutions which must be turned by their counterparts in the position indicator.

Accordingly, a further object of this invention is the provision of a follow-up control system in which the rotary induction devices in the director automatically, in response to information recorded on a tabulating medium are rotated from initial positions through less than one complete turn to the precise angular positions which they must occupy in order to position the driven object precisely in the desired location irrespectively of the number of complete turns which must be made by the rotary induction devices in the position indicator during the movement of the driven object from its starting position to its final position.

In carrying the invention into effect in one form thereof, a plurality of induction devices such as described in the foregoing, are provided together with a reader of digital data having a plurality of sensing elements which are actuable to detect digital indicia in selected locations on a digital storage medium and means responsive to actuation of such sensing elements for positioning the movable members of such induction devices in positions corresponding to the analog of the numerical value of such selected digital indicia locations.

For a more complete understanding of the invention, reference should now be had to the following specification and to the accompanying drawing in which Fig. 1 is a simple diagrammatical sketch of the follow-up control system portion of the invention, Fig. 2 is a simple diagrammatic sketch in perspective of the portion of the invention which is utilized to convert digital information recorded on a storage medium into corresponding angular positions of the rotors of the rotary induction devices in the directors, Fig. 3 is a diagrammatic representation of a punched tabulating card which may be utilized as such storage medium and upon which may be recorded the data which is to be utilized in controlling the operation of the apparatus which is used in carrying the invention into effect, Fig. 4 is a diagrammatic sketch of the differential connections between the ratchet wheels of the information converter of Fig. 2 and the rotors of the rotary induction devices of the director, Fig. 5 is a diagrammatic sketch of an alternative detail of the differential connections of Fig. 4, Fig. 6 is a chart of characteristic curves which facilitates an understanding of the operation of the follow-up control system of Fig. 1. Fig. 7 is a plot on logarithmic scales of the output voltage v. departure of the system from correspondence; Figs. 8 and 9 are diagrammatic sketches of alternative forms of static card readers and Fig. 10 is a diagrammatic sketch in perspective of an alternative form of information converter.

Referring now to the drawing, an object 1 such as a machine part which is to be moved to a desired precise position is driven by suitable driving means such as a direct current shunt-type motor 2. The object 1 may be any movable part of a machine tool. For example, it may be the table of a turret punch press, and throughout the following specification; it will be referred to as the table.

To the armature of motor 2, direct voltage of the correct polarity for the desired direction of rotation is supplied from the output circuit of a thyratron reversing motor control 3. This control comprises a thyratron 4 which, when a direct control voltage of a sufficient magnitude is supplied to its input circuit, supplies to the armature of the motor a direct voltage of the appropriate polarity for rotation in the forward direction, and a similar thyratron 5 which when a direct control voltage of sufficient magnitude is supplied to its input circuit, supplies to the armature of the motor a direct voltage of opposite polarity to effect rotation in the reverse direction.

For the purpose of controlling the supply of such control voltages to the input circuits of the thyratrons 4 and 5, a director 6 and a position indicator 7 are provided. The director 6 comprises a plurality of rotary induction devices 8, 9, 10 and 11 and the position indicator comprises an equal number of corresponding rotary induction devices 12, 13, 14 and 15. These rotary induction devices are identical and consequently, only device 12 which is selected as typical of the others will be described in detail. As shown, the device 12 is provided with a single element winding 12a and with a distributed three-element winding 12b. Either winding may be mounted on the stator member and the other on the rotor member. It is assumed however that the single element winding of all the devices in the director and in the position indicator are mounted on the rotor members and that the distributed three-element windings are mounted on the stator members.

In the position indicator, the single phase windings 12a, 13a, 14a and 15a are supplied from a suitable source of alternating voltage such as the supply lines 16, and consequently, they act as primary windings and induce alternating voltages in the secondary windings 12b, 13b, 14b and 15b. The terminals of secondary windings 12b, 13b, 14b and 15b are directly connected to corresponding terminals of the windings 8b, 9b, 10b and 11b respectively of the counterpart rotary induction devices of the director so that the voltages induced in the windings 12b, 13b, 14b, and 15b are supplied to the windings 8b, 9b, 10b and 11b. Consequently, the single phase windings 8a, 9a, 10a and 11a in the director operate as secondary windings in which are induced single phase voltages having the same phase and frequency as the voltage of the supply source 16 and each having a magnitude which is dependent upon the angular relation between the coil axes of the primary winding of a rotary induction device in the position indicator and the secondary winding of its corresponding rotary induction device in the director. For example, when the primary winding 12a and the secondary winding 8a are in correspondence zero voltage is induced in winding 8a. In this connection, the windings 8a and 12a are considered to be in correspondence when the axis of winding 8a is perpendicular to the axis of the magnetic field produced by winding 8b as shown. On the other hand, when the axes of windings 8a and 12a are 90° out of correspondence, the voltage induced in the winding 8a is a maximum, and when 180° out of correspondence, the voltage is again zero. In other words, for intermediate positions between correspondence and 180° out of correspondence the amplitude of the alternating voltage induced in the secondary winding 8a varies sinusoidally and reverses in phase at the 180° position.

The rotary induction device 12 in the position indicator is connected to the rotary induction device 13 through gearing 17 having a suitable ratio such as 10:1 so that the device 13 makes 10 complete turns for each turn of the device 12. Similarly, between devices 13 and 14 and between devices 14 and 15 are connected gearings 18 and 19 respectively each having a ratio of 10:1, i. e., the device 14 makes 10 complete turns for each turn of the device 13 and device 15 makes 10 complete turns for each turn of device 14. Thus it is seen that for each turn of the 1-speed device 12, the devices 13, 14 and 15 make 10, 100 and 1,000 turns respectively. Hence they are conveniently referred to as the 1-speed, 10-speed, 100-speed and 1,000-speed devices respectively.

The 1,000-speed device is connected to the driven table 1 through reduction gearing 20 having a suitable ratio, e. g. a ratio such that rotary induction device 15 makes one complete turn for each one inch of travel of the table 1 along its lead screw 21. From the foregoing, it will be seen that devices 14, 13 and 12 will each make one complete turn for each 10 inches, 100 inches and 1,000 inches respectively of movement of the table or 180° of rotation for 5 inches, 50 inches and 500 inches respectively of movement of the table.

In order that the motor 2 may be energized to drive table 1 in a desired direction, the voltages induced in the windings 8a, 9a, 10a and 11a, after suitable modification by electronic means, are utilized to control the energization of the thyratrons 4 and 5 from which the motor 2 is supplied. Since the phase of the voltage induced in the secondary winding of each of the rotary induction devices in the direction becomes reversed when the angular disagreement between such rotary induction device and its counterpart in the position indicator exceeds 180°, the zone within which each of the 1-speed, 10-speed, 100-speed and 1,000-speed systems exerts control over the speed and direction of rotation of the motor must be limited to less than 180°. Accordingly, provision is made for transferring control from each of the higher speed systems to the next lower speed system within such 180° zone, i. e., at a point at which the departure from correspondence of a rotary induction device in the director and its counterpart in the position indicator is less than 180°. More specifically, as the angular disagreement, usually referred to as the "error" between the 1,000-speed device 15 in the indicator and the 1,000-speed device in the director approaches 180°, control of the follow-up motor is transferred to the 100-speed system comprising devices 10 and 14. Similarly, when the error between the devices of the 100-speed system approaches 180°, control is transferred to the 10-speed system comprising devices 9 and 13 and finally when the error between the 10-speed system devices approaches the 180° limit, control of motor 2 is transferred to the 1-speed system comprising devices 8 and 12. As previously pointed out, the ratio of the gearing between the 1-speed device 12 and the table 1 is such that it rotates 180° for five-hundred inches movement of the table 1. It is assumed for the purpose of this disclosure that the maximum travel of table 1 is two-hundred and fifty inches. Consequently, the error between devices 8 and 12 of the 1-speed system never closely approaches 180°.

For effecting transfer of controls selectively and successively between the 1,000-speed, the 100-speed, the 10-speed and the 1-speed systems, a take-over circuit 22 is provided which comprises a network array of fixed resistors and voltage sensitive non-linear resistors. An important part of this network is a voltage divider comprising fixed and non-linear resistor units in alternation. Specifically, it comprises fixed resistor 23, non-linear resistor 24 and a fixed resistor unit divided into two sections 25a and 25b having a common terminal 25c, non-linear resistor 26, a fixed resistor divided into two sections 27a and 27b having a common terminal 27c and a non-linear resistor 28. Corresponding terminals of the secondary windings 8a, 9a, 10a, 11a are connected to each other by the common conductor 29 and their opposite terminals are connected to selected points on the non-linear voltage divider. As shown, the opposite terminals of windings 8a and 11a are connected to opposite terminals 28a and 23a of the divider and those of windings 9a and 10a are connected to intermediate points 26a and 24a respectively.

Cooperating with the voltage divider 23a—28a is a second voltage divider which comprises fixed resistors 30, 31 and 32 serially connected between an intermediate point 23b of the first divider and a terminal 33. Between intermediate point 25c of the first divider and intermediate point 30a of the second divider, a fixed resistor 34 and a non-linear resistor 35 are connected in series relationship, and between point 30a and common conductor 29 is connected a fixed resistor 36. Also between conductor 29 and intermediate point 31a is connected a fixed resistor 37 and between the same point and intermediate point 27c of the first divider is connected a non-linear resistor 38. Between intermediate terminal 23b of the first divider and common conductor 29 is connected a series combination of a fixed resistor 39 and a non-linear resistor 40. In parallel with non-linear resistor 24 is connected a fixed resistor 41 and between end terminal 28a of the first divider output terminal 33 is connected a non-linear resistor 42.

Since voltages are supplied by the secondary windings, 8a, 9a, 10a and 11a, between common conductor 29 and distributed points on the first voltage divider, the conductor 29 and such divider may be considered to be the input of the take-over network and since the voltage which appears across conductor 29 and terminal 23 is utilized as a signal voltage to control the motor 2, these two terminals are considered to be the output terminals of the network. A fixed resistor 43 is connected across these terminals and is usually referred to as the output resistor.

Although the non-linear resistors 24, 26, 28, 35, 38, 40 and 42 may be of any suitable type and made of any suitable material, they are preferably made of a composition of silicon-carbide crystals held together by a suitable binder. Such non-linear resistance material is sold on the market under the trademark Thyrite and is described in U. S. Patent 1,822,742, Karl B. McEachron, dated September 8, 1931.

An understanding of the manner in which the take-over network operates selectively to transfer control of the motor 2 from a higher speed rotary induction device system to the next lower speed system as the error of the high speed system approaches 180° is facilitated by chart of characteristic curves in Fig. 6 in which abscissae represent displacement in angular degrees of the 1,000-speed rotary induction device system and ordinates represent error voltage, i. e., the voltages induced in secondary windings 8a 9a, 10a and 11a. The envelope of the maximum amplitudes of error voltage of the 1,000-speed system is represented by the sinusoidal curve 44. This curve indicates that such envelope varies sinusoidally between zero and maximum values with increasing angular displacement of the rotor winding 11a of the director from correspondence with winding 15a in the position indicator. Negative values of this envelope indicate a reversal in phase of the voltage induced in winding 11a with respect to the voltage of the source 16 from which the primary windings 12a, 13a, 14a and 15a in the position indicator are supplied. Since a phase reversal of the voltage induced in winding 11a would produce unwanted reversal in direction of rotation of the motor 2, the control of such motor must be transferred to the 100-speed rotary induction device system before the angular error between windings 11a and 15a attains a value of 180°. Such transfer is effected by the non-linear error signal takeover circuit 22.

In Fig. 6, the envelope of maximum amplitudes of error voltage of the 100-speed system is represented by the curve 45. As indicated by this curve, the envelope varies sinusoidally between zero and maximum values with increasing angular displacement of rotor winding 10a in the director from correspondence with rotor winding 14a in the position indicator. Negative values of the curve 45 indicate that the phase of the voltage of line frequency which is induced in winding 10a is reversed with respect to that of the source 16. Since such phase reversal will produce reverse operation of the motor 2, control must be taken away from the 100-speed system prior to the 180° error point and transferred to the 10-speed system.

Similar considerations apply to the 10-speed system of which the envelope of maximum amplitudes of the error voltage is represented by the curve 46. Like the curves 44 and 45, the curve 46 is a sinusoid. However, owing to the scale employed in Fig. 6, only the first 36° of this curve is illustrated. This amount corresponds to 3600° of the 1,000-speed system. Before phase reversal of the voltages induced in the rotor winding 9a takes place, control of the motor 2 must be taken away from the 10-speed system and transferred to the 1-speed system of which the envelope of maximum amplitudes is represented by curve 47. Owing to the scale employed, only the first 3.6° of this curve is illustrated in Fig. 6.

An understanding of the operation of the takeover circuit 22 to transfer control between higher and lower speed rotary induction device systems will be facilitated by reference to its output voltage versus degrees angular disagreement of the 1,000-speed system characteristic which is represented by the curve 48 in Fig. 7. In order to illustrate the shape of the curve 48 throughout substantially the entire range of 180° of the low speed system or 180,000° of the 1,000-speed system it is plotted in logarithmic coordinates in Fig. 7. The condition of correspondence, i. e., zero error between the rotor windings of the director 6 and of the position indicator 7 of the 1, 10, 100 and 1,000 speed systems is indicated by the intersection of curves 44, 45, 46 and 47 at the zero degree origin of coordinates in Fig. 6. In other words, at zero error, zero voltage is induced in each of the rotor windings 8a, 9a, 10a and 11a. Consequently, at correspondence the output voltage of the take-over circuit at terminals 29 and 33 is also zero as indicated by the zero ordinate of curve 48. With increasing angular displacement between the rotors in the director and rotors in the position indicator, voltages of which the envelopes of their maximum amplitudes are represented by curves 44, 45, 46 and 47 are induced in windings 11a, 10a, 9a and 8a. At very low voltages, the individual resistances of all the non-linear resistors 24, 26, 28, 35, 38, 40 and 42 are extremely high, e. g., in excess of ten megohms. Under these conditions, it may be assumed that the resistances of the non-linear resistors are infinite and that the output voltage is a function of the fixed resistors of the circuit. For small errors in correspondence, the voltage supplied to the take-over circuit by the 1,000-speed system greatly exceeds the voltages supplied by the others and dominates in the production of the output voltage as illustrated by the portion of the output voltage curve between zero and the point 48a. With further increases in the error, the voltage induced in the winding 11a of the 1,000-speed system decreases rapidly to zero and again increases in amplitude but in reverse phase. As its phase reverses, the non-linear resistors operate to limit the amount thereof which appears at the output terminals of take-over circuit and consequently between the points 48a and 48b of curve 48 the voltage of the 100-speed system which is larger than the voltages of the 10-speed and 1-speed systems is dominant in determining the output voltage characteristic. Further increase in the error causes the voltage of the 100-speed system to decrease to zero and subsequently to increase but in reverse phase. As before, the non-linear resistors of the take-over circuit are effective to limit the amount of reverse phase voltage induced in the secondary winding 10a which appears at the output terminal of the take-over circuit and consequently the voltage of the 10-speed system is dominant in determining the characteristic of the output in the region between the points 48b and 48c.

Thus with increasing error, there is produced at the output terminals of the take-over circuit an alternating error voltage of which the envelope of the maximum amplitudes of the individual cycles of line frequency is represented by the curve 48.

This alternating error voltage is amplified by means of a twin triode cathode-coupled amplifier valve 49. Preferably, this valve is a 6SN7GT high vacuum valve; although other types of amplifier valves may be employed if desired. The output voltage of the amplifier appears at the anodes 49a and 49b and through a transformer 50 of which the primary winding is connected across anodes 49a and 49b, the amplified error voltage is supplied to the anode-cathode circuits of an electric valve type discriminator 51 having a single-ended output. Preferably, this discriminator comprises two twin triode high vacuum valves 52 and 53. The anodes 52a and 53a of these valves are connected to the opposite terminals of the secondary winding 50b and their cathodes are connected in common to its center tap through resistors 54 and 55. Similarly, the anodes 52b and 53b are connected to opposite terminals of the secondary winding 50c of which the center tap is connected through resistors 56 and 54 to the cathodes 52c and 53c.

To the input control circuits of both valves 52 and 53 are supplied alternating voltages of the same frequency as that of the voltages which are supplied to the anodes. In this connection, the control electrodes 52d and 53d are connected to opposite terminals of the secondary winding 57b of a transformer 57 of which the primary winding 57a is connected across the alternating voltage supply conductors 16. Its centertap is connected through resistor 55 to the cathodes 52c and 53c. Similarly, the control electrodes 52e and 53e are connected to opposite terminals of a secondary winding 57c of which the centertap is connected to the cathodes 52f and 53f.

Briefly, the operation of the discriminator is as follows. In the condition of correspondence between the rotor windings 12a, 13a, 14a and 15a of the position indicator and the rotor windings 8a, 9a, 10a and 11a respectively of the director, zero voltage is supplied to the take-over network 22 and zero voltage is likewise supplied to the amplifier 49 and to the anode circuits of the discriminator. Consequently, the valves 52 and 53 are non-conducting and the voltage across the resistor 54 is zero. Any error, i. e., angular disagreement of the rotor windings of the position indicator with the rotor windings of the director results in supplying to the take-over circuit, an A. C. error voltage. This voltage is modified in the take-over circuit in accordance with curve 48, and after amplification, is supplied to the anodes of valves 52 and 53. For one direction of error, the voltage supplied to anodes 52a and 53a will be in phase with the voltage supplied to the control electrodes 52e and 53e and the voltage supplied to anodes 52b and 53b will be 180° out-of-phase with the voltages supplied to the control electrodes 52d and 53d. Conduction will take place in the right hand conducting paths of valves 52 and 53 and the left hand paths will be non-conducting. Consequently, there will appear across the output circuit resistor 54 a direct voltage which is positive at its right hand terminal, and which has a value that is approximately proportional to the magnitude of the error, for small values of error.

For an error of opposite direction, a direct voltage of reverse polarity will appear across the terminals of output resistor 54. Thus there is produced across the output resistor of the discriminator a direct voltage having a polarity which corresponds to the direction of the error and a magnitude which is approximately proportional to the error for small values thereof.

The voltage across the output resistor 54 of the discriminator is supplied to the input circuit of an amplifier of the cathode follower type. This cathode follower comprises an electric valve 58 which may be any suitable type of valve such as one half of a 6SN7GT high vacuum valve. It is supplied from a suitable source of direct voltage such as represented in the drawing by conductors 59, 60 and 61 which provide three levels of voltage. The voltage of supply conductor 61 may be considered to be at ground or zero potential; that of conductor 60 to be 100 volts positive with respect to ground and that of conductor 59 to be 300 volts positive with respect to ground. The anode 58a of cathode follower valve 58 is connected to the 300 volt supply conductor 59 and its cathode 58b is connected through cathode resistors 62 and 63 to the zero voltage supply conductor. To the input or control electrode circuit of the cathode follower valve is supplied the output voltage of the discriminator. This cathode follower input circuit includes the discriminator output resistor 54 and is traced from control electrode 58c through resistors 64, 65 and 66, discriminator output resistor 54 to 100-volt supply conductor 60. In operation, the voltage of the cathode closely follows the voltage of the control electrode, trailing behind it just sufficiently to produce the change in control electrode to cathode voltage necessary to effect the desired change in cathode current. The output voltage may be derived from across the total cathode resistor or from across any selected portion of it. In the illustrated embodiment, the voltage across the cathode resistor 63 is utilized as the output voltage and is supplied to the input circuit of an amplifier stage of the reversing motor control circuit 3. This amplifier is illustrated as comprising a pair of matched electric valves such as the twin triode electric valve 67 of which the anodes 67a and 67b are connected through equal resistors 68 and 69 to the 300-volt positive supply conductor 59, the cathodes 67c and 67d are connected through a common resistor 70 of high value to the zero voltage supply conductor 61. To the 100-volt supply terminal 60 is connected, the control electrode 67e of the left hand conducting path whereas the control electrode 67f of the right hand conducting path is connected to the common terminal 63a of the cathode resistor 62 and 63 of the cathode follower so that the output voltage across resistor 63 is supplied to the input circuit of the cathode coupled amplifier 67. The voltage between the anodes 67a and 67b is utilized as the output voltage of the amplifier and is supplied to the input control circuits of the forward and reverse thyratrons 4 and 5.

The following is a short description of the operation of cathode coupled amplifier 67. As long as the voltages of both control electrodes 67e and 67f are equal, the voltages of both anodes are equal and consequently equal voltages are supplied to the input circuits of thyratrons 4 and 5. However, if the voltage of the control electrode for one conducting path varies slightly with respect to the voltage of the other, the current in the first conducting path as well as the RI drop in the common cathode resistor change and this produces a change in the opposite sense in the current in the other conducting path. For example, assume that the voltage of control electrode 67f becomes more negative. The current in the right hand conducting path decreases correspondingly thereby effecting a decrease in the voltage across the cathode resistor 70 and lowering the voltage of the cathode to a value closer to the fixed voltage of the control electrode 67e. This increases the current in the left hand conducting path substantially to restore the original total cathode current i. e. to restore the sum of the current flowing in both conducting paths to its original value.

Voltage is supplied to the armature of the table motor 2 from the secondary winding 71b of a transformer to the terminals of which the armature is connected through the thyratrons 4 and 5 which are reversely connected in parallel i. e. the anode 4a and cathode 5b are connected to one terminal and the anode 5a and cathode 4b are connected to the opposite terminal. As shown, the primary winding 71a is connected to supply terminal 16.

The anode 67a of the cathode coupled amplifier is connected to the input control circuit of thyratron 4 and included in the connection is a static phase-shift bridge network of which a resistor 72, a capacitor 73 and opposite halves of the secondary winding 71c of supply transformer 71 constitute the arms. As a result of this connection there is supplied to the input circuit of thyratron 4 a resultant voltage having an alternating component which is dephased with respect to its anode voltage and a direct component which is variable in magnitude. The effect of variation of the resultant voltage on the conduction of the thyratron is to vary its firing point each positive half cycle of its anode voltage in accordance with variations in the magnitude of the direct component. A similar static phase-shift bridge network 74 is connected in the input control circuit of thyratron 5 between its control electrode 5c and the anode 67b of the cathode-coupled amplifier.

The portion of the follow-up control system thus far described operates in the following manner: In the balanced condition, i. e. the rotors of the rotary induction devices 12, 13, 14 and 15 in the position indicator are in correspondence with their counterparts 8, 9, 10 and 11 in the director, and the voltage across the resistor 54 of the discriminator is zero. Consequently, the voltage of the terminal 63a in the cathode follower circuit will have a value such that both halves of the cathode coupled twin triode 67 are conducting equal amounts of current and approximately in mid-range. Such equal conduction in both halves of valve 67 produces at the anodes 67a of 67b equal voltages of such magnitude that the thyratrons 4 and 5 supply in opposite directions to the armature of the motor equal but relatively small amounts of current with the result that the motor is held at standstill.

If the rotors of the rotary induction devices of the position indicator are not in correspondence with their counterparts in the director, an error is said to exist, and as previously explained, an error voltage appears across the output resistor 54 of the discriminator. Assuming that with angular disagreement in a direction designated as the forward direction, the error voltage is positive at terminal 54a, the current conducted by cathode follower 58 increases thereby making the voltage at point 63a more positive. This results in increasing the current conducted in the right hand path of valve 67 and decreasing it in the left hand path thereby to make the voltage of anode 67a more positive than the voltage of anode 67b. The more positive voltage at anode 67a advances the firing point of forward thyratron 4 thereby causing it to supply to the armature of the motor 2 an increased amount of current. Conversely, the more negative voltage of anode 67b retards the firing point of the reverse thyratron 5 causing it to cease conduction. As a result, the motor rotates in the forward direction thereby rotating the rotors of the rotary induction devices in the position indicator toward correspondence with their counterparts in the director. Simultaneously, it drives the table 1 in the forward direction. Upon arrival of the rotors of the position indicator in correspondence with the rotors in the directors, the output voltages of windings 8a, 9a, 10a and 11a becomes zero. Likewise the voltage across the output resistor 54 of the discriminator vanishes and as a result, the motor 2 stops and the table is brought to rest in a new position, after a total travel which is proportional to the total rotation of the rotors in the position indicator.

If the original angular disagreement between the rotors of the position indicator and those of the director had been in the reverse direction, the polarity of the error voltage which appeared across the output resistor 54 of the discriminator would have been reversed. In consequence, the motor 2 would have been energized for rotation in the reverse direction to drive the rotors of the position indicator toward correspondence with the rotors of the director, and the table would have been driven in the reverse direction and brought to standstill in a new position after a total travel proportional to the total rotation of the rotors of the position indicator.

In order that the control system thus far described may be utilized to effect movements of the table 1 to predetermined positions in response to digital information recorded on a tabulating medium such as the punched tabulating card 75 which is illustrated in Fig. 3, means are provided for reading such cards and utilizing the information obtained therefrom to move the rotors in the director into angular positions which correspond to those which the rotors of the position indicator must occupy when the table is in such predetermined positions.

In Fig. 2, is illustrated diagrammatically a moving card reader 76, a device 77 for storing the digital information obtained from the punched tabulating cards for use after the moving card has passed the reading position and means 78 for utilizing such stored information to move the rotors of the rotary induction devices of the director to the same angular positions as those which the rotors of the position indicator will occupy when the table 1 is in the position defined by the digital information on card 75. Because of its function, the means 78 is referred to as the rotor positioning assembly. It will be noted that in positioning the rotors in response to and in accordance with digital information it is converting digital information into analog information. The card reader 76 comprises a contact roll 79 which is insulated from a shaft 80 upon which it is mounted for rotation by suitable driving means (not shown). Also mounted on this shaft is a pulse timing circuit breaker 81 of which its function is to prepare for closing in each digital row reading station of the card the circuit of the operating coil 82a of a rotary stepping switch 82. There is one such switch for each decimal column of the tabulating card. Switch 82 may be considered to be the switch associated with the "hundreds" column. Similar switches (not shown) are provided for the "tens," "units," "tenths," "hundredths" and "thousandths" column.

In the card reader there are provided a plurality of column reading brushes such as the brush 83 which is illustrated as the reading brush for the hundreds column. To understand the operation of this portion of the card reader and information storage device, assume that a hole is punched for the digit 2 in the hundreds column of the card which is passing through the reader. This card is assumed to be the card 75 which is illustrated in Fig. 3.

Until the brush 83 makes contact with the contact roll 79 through the hole in the hundreds column, the only action which takes place is the pulse timing circuit breaker 81 closing and opening its contacts in the digit 0 and digit 1 reading stations. But this has no further effect since the circuit is open at the brush. However, when the digit 2 hole reaches the reading station, the brush makes contact with the contact roll through the hole and this time the closing of the contacts of the circuit breaker completes the circuit through the operating coil 82a of the stepping switch to the positive and negative supply conductors 84 and 85. In response to energization and deenergization, the stepping switch magnet advances the wiper contact 82b of the switch from its "home" position contact to the digit 9 position contact. As the card 75 leaves the digit 2 reading station, the circuit previously traced through the hole in the card is interrupted and of course there are no other digit holes punched in the hundreds column. However, the circuit through the coil 82a remains completed through the contacts of the pulse timer, bypass conductor 86, contacts of the lower bank of the stepping switch (which are wired together) and the wiper contact 82b. Consequently, as the card reader advances card 75 through the remaining seven reading stations, the coil circuit is closed and opened at each station by the pulse timing circuit breaker 81 seven times thereby advancing the wiper contact 82b of the first bank and the wiper 82c of the second bank to their digit 2 positions which correspond to the hole punched in the digit 2 row of the hundreds column of the card 75.

In a similar manner, the wiper contacts of the first and second banks of the stepping switch for each of the other decimal columns of the tabulating card are moved to engage stationary digit position contacts which correspond to the digit position in which a hole is punched in each such column. For example, if a hole is punched in the digit 3 hole of the tens column, the moving contacts of the first and second banks of the tens column stepping switch (not shown) will be stepped to the digit 3 stationary contacts of the first and second banks.

The rotor positioning assembly 78 is illustrated as comprising a rotatably mounted center shaft 87 together with means for oscillating the shaft through forward and return angular excursions, once for each complete cycle of operation of the controlled machine or alternatively, once for each tabulating card passing through the card reader. This oscillating means is illustrated as comprising a constant speed motor 88, a cam 89, and a single revolution electromagnetically operated clutch 90 for coupling the cam to the motor once for each complete cycle of the controlled machine. The output or driven member of the clutch makes one complete revolution each time the clutch is energized. A gear 91, which is suitably mounted for rotation, is provided with a pin 91a which by means of a linkage 92 is mechanically connected to a pin 89a on the cam. Secured to the shaft 87 is a gear 93 which meshes with gear 91 thereby to impart to the shaft an oscillating motion in response to rotation of the cam. Preferably, the gear ratios and linkage are designed to effect a complete excursion, i. e. forward and return movement of the shaft 87 through an angle of approximately 300° for each complete revolution of the output member of the clutch.

Mounted upon the shaft 87 and spaced from each other by an appropriate interval are a plurality of ratchet wheel assemblies, one for each of the stepping switches and thus, one for each decimal column of the tabulating card. In Fig. 2, only two such ratchet wheel assemblies 94 and 95 are illustrated, and only the assembly 94 for the hundreds decimal column is described in detail since those for the other significant decimal columns are preferably identical. It comprises a ratchet wheel 96 having ten equally spaced teeth which occupy 270° of its circumference and which have digital notations from 0 to 9. It is mounted on shaft 87 for relative rotation with respect thereto. Mounted in a fixed hub on the shaft is a pin 94a which oscillates with the shaft through an angle of 300°. On the ratchet wheel 96 and in the path of the oscillating pin 94a is mounted a pin 96a.

Biasing the ratchet wheel 96 to the extreme counterclockwise position in which is shown, in a spiral spring 97 of which one end is attached to a hub 96b of the ratchet wheel and the other end is attached to a fixed element of the supporting frame (not shown). For the purpose of stopping the ratchet wheel in any of ten equally spaced apart digital positions, a ratchet lever magnet 98 is provided. It comprises an operating coil 98a, a pivotally mounted armature 98b and a lever 98c which is attached to the armature. Normally, i. e., when the coil is de-energized, the armature is biased by means of a spring (not shown) to a position in which the lever is withdrawn from the path of the teeth of the ratchet wheel. When the coil is energized, the armature is attracted to a position in which the lever projects into the path of the teeth to stop the ratchet wheel in one of its digital positions.

Mounted upon the shaft 87 is wiper contact 99a of a pulse distributer switch 99 which is provided with ten digital stationary contacts of which each is connected to the corresponding stationary digital contact in the second bank of the hundreds column stepping switch 82. In this connection, it will be remembered that an individual stepping switch similar to the switch 82 is provided for each significant decimal column of the tabulating card. The wiper contact 99a is connected through the normally open contacts of a switch 100 to the positive supply conductor 84. As shown in the drawing, the contacts of the switch 100 are operated by the cam 89, and in this connection, the cam is so designed that during the clockwise portion of the excursion of the shaft 87 and the oscillating pins 94a, 95a, etc. carried thereby, the cam 89 opens the contacts of the switch 100 and during the return or counterclockwise portion of the excursion the cam closes the contacts.

Following is a brief description of the operation of the hundreds column ratchet wheel assembly 94 which may be taken as typical of the operation of the other ratchet wheel assemblies of which, it will be remembered, there is one for each significant decimal column of the tabulating card: During the progress of an operating cycle of the controlled machine, the card reader 76 is actuated to transport the tabulating card 75 for the next cycle through the reading stations. Since the card 75 has a hole punched in the digit 2 row of the hundreds column, the wiper contact 82b of the hundreds columns stepping switch 82 is actuated into engagement with the digit 2 stationary contact. Following the completion of the last immediately preceding cycle of operation of the controlled machine, the single revolution clutch 90 is energized to effect one complete oscillative excursion of shaft 87. During the clockwise portion of such excursion, the pin 94a engages pin 96a and rotates the ratchet wheel to its extreme clockwise position and consequently carries the wiper contact 99a of the pulse distributor switch past its digit 0 contact position.

In response to the bias of the spring 97, the pin 96a, the ratchet wheel 96 and the wiper contact 99a follow the return or counterclockwise swing of the pin 94a. When the wiper contact 99a engages its digit 2 stationary contact, an energizing circuit for the operating coil 98a of the ratchet lever magnet is completed from the positive supply conductor 84 through contacts of the cam-operated switch 100 (closed during the counterclockwise return swing of the shaft) wiper contact 99a and digit 2 stationary contact of pulse distributor switch 99, stationary digit 2 contact and wiper contact 82c of the hundreds column stepping switch 82 and operating coil 98a to the negative supply conductor 85. Responsively to energization, the ratchet lever magnet 98 advances its lever 98c into the path of the approaching digit tooth of the ratchet wheel to stop it in its digit 2 angular position. The shaft 87, pin 94a, and wiper contact 99a complete their return swings while the self-holding ratchet lever holds the ratchet wheel in its digit 2 position.

As previously pointed out, there is a separate ratchet wheel assembly for each decimal column of the tabulating card. Assuming that the card 75 has six significant decimal columns as illustrated, there will be in addition to the hundreds column assembly 94 and in the tens column assembly 95 illustrated in Fig. 2 ratchet wheel assemblies 101, 102, 103, and 104 for the units, tenths, hundredths and thousandths decimal columns respectively as illustrated conventionally in Fig. 4. In response to the passage of the card 75 through the card reader, the ratchet wheel of each of these assemblies will be stopped in a digital position corresponding to the digit for which a hole is punched in the corresponding decimal column of the card. The operation will be the same as that described for ratchet wheel assembly 94. From the foregoing, it is seen that digital information recorded in the decimal columns of the tabulating card is converted into digital positions of a plurality of ratchet wheels of which there is one for each of such columns.

For the purpose of converting such digital positions of the ratchet wheels into final analog positions of the rotors of the rotary induction devices 8, 9, 10 and 11 of the director 6, suitable differential gearing is provided for mechanically connecting each rotary induction device to its corresponding ratchet wheel and for interconnecting the rotary induction devices themselves to provide for feeding back to each higher decimal order rotary induction device, a predetermined fraction of the next lower order rotary induction device. As shown, a mechanical differential device 105 is provided for interconnecting the ratchet wheel 96 of the hundreds column assembly, the one-speed rotary induction device 8 and the ten-speed rotary induction device 9. This differential device 105 comprises an output element 105a which is connected through gear 106 to the one-speed rotary induction device 8, an input element 105b to which the ratchet wheel 96 is connected through gearing 107. The ratio of the gearing between the ratchet wheel 96 and the rotary induction device 8 is such that with the input member 105b restrained, the rotary induction device 8 rotates 36° for an angular movement of the ratchet wheel equal to the angle between one tooth and the next, i. e., 30°. Thus for a hole punched in the digit row 2 of the hundreds column of the card, the rotor or rotary induction device 8 would be rotated 72° from an initial position.

Similarly, the ratchet wheel of the tens column assembly 95 is connected through gear 108, mechanical differential 109 and gearing 110 to the 10-speed rotary induction device 9. As shown in Fig. 2 and as conventionally illustrated in Fig. 4, the ten-speed rotary induction device 9 is interconnected with the one-speed rotary induction device 8 through the differential device 105 to the second input member 105b of which it is connected through gearing 111 having a ratio of 1:10. The result is that for each 10° of rotation of device 9, the device 8 will be given an added rotation of 1°. This rotation which is fed back from the device 9 to the device 8 is added to the rotation of device 8 from its initial position which was produced by the counterclockwise rotation of the ratchet wheel 96 from its extreme clockwise position. The ratio of gearing 108 and 110 is the same as that of gearing 106 and 107, i. e. it is such that for each one tooth rotation of the ratchet wheel 95, the device 9 rotates 36°. Thus for a hole punched in the digit 3 row of the tens column of tabulating card, the rotary induction device 9 is rotated 108° from its initial position and by virtue of the 1:10 ratio feedback connection through the gearing 111 and differential device 105, a rotation of 10.8 degrees is added to the 72° previous rotation of the 1-speed rotary induction device 8.

For the remaining ratchet wheel assemblies 101, 102, 103 and 104, corresponding mechanical differential devices 112, 113, 114 and 115 are provided. The differential devices 112 and 113 connect the ratchet wheels of assemblies 101 and 102 with the 100-speed and 1,000-speed rotary induction devices 10 and 11 respectively. The differential 112 provides feedback connections between the 1,000-speed device and the 100-speed device and the differential device 109 provides feedback connections between the 100-speed device and the 10-speed device. Similarly, the ratio of the gear connections in these feedback connections is 1:10.

Since the four rotary induction devices 8, 9, 10 and 11 are capable of providing the maximum required refinement of control, no rotary induction devices corresponding to the hundredths and thousandths column of the card are provided. The digital information obtained from these columns as the card 75 passes through the card reader produces rotations of corresponding numbers of teeth of the ratchet wheels of assemblies 103 and 104 and these rotations produce corresponding rotations of the output members 114a and 115a of differential devices 114 and 115 respectively. One-tenth of the rotation of output member 114a is transmitted through the feedback connections and added to the rotation of the 1,000-speed rotary induction device 11. Similarly, one-tenth of the rotation of the output member 115a is transmitted through the feedback connection to the input member 114b of the differential device 114 and one-tenth of this tenth or 1/100 of the rotation of output 115a is transmitted back and added to the rotation of the one-thousand-speed rotary induction device 11. If desired, the differential device 115 may be omitted and the connection made directly from the ratchet wheel of assembly 104 to the second input member 114b of differential device 114 as illustrated diagrammatically in Fig. 5.

From the foregoing, it is seen that in response to the passage of a tabulating card 75 through the card reader the ratchet wheel of each of the assemblies is rotated from its initial or extreme clockwise position, a number of teeth which correspond to the digital row in which a hole is punched in the corresponding decimal column of the card 75. Also, each of the rotary induction devices 8, 9, 10 and 11 is, during the clockwise rotation of the ratchet wheel to which it is connected, rotated to an extreme clockwise position which may be regarded as its initial position. Likewise, during the counterclockwise rotation of each such ratchet wheel its associated rotary induction device is rotated to a position which is displaced from such initial position by a number of degrees which is equal to 36° times the number of steps rotation of the ratchet wheel plus one-tenth the total rotation of the next lower decimal order rotary induction device.

With the foregoing understanding of the elements and their organization, the operation of the control system will readily be understood from the following detailed description in which it is assumed that the table 1 is to be moved to a position which is a predetermined distance e. g. 235.164″ from an initial position. Since the 1,000-speed rotary induction device 15 in the position indicator is geared to the table 1 through gearing which causes it to make one complete rotation for each inch of travel of the table, it will make 235 complete rotations plus .164 of a complete rotation while the table is moving 235.164″. In other words, its rotor will come to rest in a final angular position which is displaced from a predetermined initial position .164×360° or 59.04°. By similar calculation, it is seen that for a 235.164″ movement of the table, rotary induction devices 12, 13, 14 and 15 must come to rest in final positions angularly displaced from such predetermined initial position as shown in the following Table I.

TABLE I

| Rotary induction devices | 12 | 13 | 14 | 15 |
|---|---|---|---|---|
| Final angular displacement for initial position for 235.164″ displacement of table from initial position | 84.65904 | 126.5904 | 185.904 | 59.04 |

If the table 1 is to be brought to rest by action of the follow-up control system in a position 235.164″ from an initial position, the corresponding rotary induction devices 8, 9, 10 and 11 in the director must be preset in the identical angular positions which the rotors of their counterpart devices in the position indicator occupy when the table is exactly 235.164″ from such initial position. In other words, the rotary induction devices 8, 9, 10 and 11 must be preset in the angular positions set forth in the Table I for the rotary induction devices 12, 13, 14 and 15 respectively of the position indicator. This prepositioning must be accomplished by operation of the card reader to convert digital information on the tabulating card to such positions of the director rotors. Stated in another way, the rotor positioning assembly must convert digital information into analog information. If, as assumed, the table is to be moved to, and accurately stopped, in a position 235.164″ from an initial position, holes will be punched in digital rows of the decimal columns of card 75 as indicated in Fig. 3. In this connection, it will be noted that a hole is punched in the digit 2 row of the hundreds column and another in the digit 3 row of the tens column, etc.

The hole in the digit 4 row of the thousandths column produces a rotation of 4×36° or 144° rotation of the output of differential device 115, and by virtue of the feedbacks previously described it also produces .4×36° of 14.4° rotation of the output of differential device 114; .04×36° or 1.44° rotation of the rotor of the 1,000-speed rotary induction speed device 11; .004×36° or .144° rotation of the rotor of the 100-speed rotary induction device 10; .0004×36° or .0144° rotation of the rotor of the 10-speed device 9 and .00004×36° or .00144° rotation of the 1-speed device 8. The foregoing figures for the rotation of the rotary induction devices 8, 9, 10 and 11 are reproduced in the sixth line of Table II.

TABLE II

*Angular rotations from reference position of rotors of rotary induction devices of director in response to digits punched in tabulating card*

| Column | Digit | Rotor of 1-speed device 8, degrees | Rotor of 10-speed device 9, degrees | Rotor of 100-speed device 10, degrees | Rotor of 1,000-speed device 11, degrees |
|---|---|---|---|---|---|
| Hundreds | 2 | 72 | | | |
| Tens | 3 | 10.8 | 108 | | |
| Units | 5 | 1.8 | 18 | 180 | |
| Tenths | 1 | .036 | .36 | 3.6 | 36 |
| Hundredths | 6 | .0216 | .216 | 2.16 | 21.6 |
| Thousandths | 4 | .00144 | .0144 | .144 | 1.44 |
| Total rotation of rotor from reference position | | 84.65904 | 126.5904 | 185.904 | 59.04 |

Similarly, as indicated in the fifth line of the table, the hole in the digit 6 row of the hundredths column produces 6×36° or 216° rotation of the output of differential device 114, and by virtue of the feedbacks, rotations of 21.6, 2.16, .216 and .0216 degrees of the devices 11, 10, 9, and 8 from an initial position. Likewise the digit 1 hole in the tenths column of the card produces 36° rotation of the rotor of the 1,000-speed device 11 by virtue of the feedback connections 3.6°, .36°, .036° rotation of the devices 10, 9, and 8 respectively. As shown in the third line of the table, the digit 5 produces 180° rotation of the 100-speed device 10, and by virtue of the feedback connections, it produces 18° and 1.8° rotation of the device 9 and 8 respectively. The digit 3 in the tens column produces 108° rotation of the 10-speed device 9 and by virtue of the feedback 10.8° rotation of the 1-speed device 8. Finally, the digit 2 in the hundreds column produces 72° rotation of the 1-speed device, and since it is the highest decimal ordered device of the system, it has no feedback connection to a higher decimal ordered device.

In the seventh line of Table II and in the appropriate column, the total rotation of the rotor of each rotary induction device is shown. By comparison with Table I, it will be noted that the total rotation from a predetermined initial position for each of the devices is exactly equal to the final angular position of its counterpart in the position indicator when the table 1 is 235.164″ from its predetermined initial position.

During the passage of the card 75 through the card reader, the rotary induction devices 12, 13, 14 and 15 in the position indicator are maintained deenergized by means of an electromagnetically actuated relay (not shown) in the supply connections to the primary windings of the primary devices. The energization and deenergization of such relay may be controlled by contacts in the circuit of its operating coil which are controlled by a cam such as cam 89 of the card reader.

Assuming now that the rotors 12a, 13a, 14a and 15a in the position indicator are in the positions which they occupied at the completion of the previous cycle of operation of the controlled machine, the passage of the card 75 through the reading stations of the card reader effects rotation of the rotors of the rotary induction devices 8, 9, 10 and 11 in the director, first to their initial or extreme clockwise positions, and then to the positions shown in the total row of Table II. When the passage of the card 75 through he reader is completed, the primary windings 12a, 13a, 14a and 15a in the position indicator are energized by operation of the cam-actuated switch referred to in the foregoing. As a result, voltages are induced in the windings 8a, 9a, 10a and 11a in the director and such induced voltages are supplied to the take-over circuit 22. The voltage at the output terminals 29 and 33 of the take-over circuit is utilized in the manner described in the foregoing to energize the motor 2 for the rotation at full speed in the appropriate direction to drive the table 1 toward a position 235.164" from a predetermined initial position.

As the table arrives within approximately forty-five inches of its final position, the rotor of the 1-speed rotor induction device in the position indicator arrives within approximately 16.2° of correspondence with the 1-speed device 8 in the director. Consequently, as can be extrapolated from curve 47 of Fig. 6, the voltage induced in winding 8a decreases to such a low value that it ceases to be a dominant factor in the output voltage of the takeover network. However, from this point until the table arrives at a point within approximately 4.5 inches of its final position, the voltage induced in the secondary winding of the 10-speed rotary induction device 9 is the dominant factor in the output voltage and controls the energization of the follow-up motor. In a similar manner, control of the motor 2 is transferred from the 10-speed system to the 100-speed system and from the 100-speed system to the 1000-speed system as the rotors 13a and 14a of the position indicator successively arrive within approximately 16.2° of correspondence with the rotors 9a and 10a respectively in the director. As the rotor of the 1,000-speed device in the position indicator arrives within approximately 16.2° of correspondence with the rotor of the 1,000-speed device in the director, the voltage induced in the winding 11a decreases to such a low value that the phase of the voltage applied to the input circuit of the active thyratron (assumed to be the forward thyratron 4) is retarded and the speed of the motor 2 is correspondingly decelerated. Coincidently with the arrival of table 1 at a position 235.164" from its predetermined initial position each of the rotors 12a, 13a, 14a and 15a of the position indicator is in correspondence with its counterpart 8a, 9a, 10a or 11a in the director. As a result, zero voltage is induced in windings 8a, 9a, 10a and 11a and the phase of the voltage supplied to the input circuit of forward thyratron 4 is retarded to the point at which forward thyratron 4 and reverse thyratron 5 supply small but equal amounts of current in opposite directions to the armature of the motor. As a result, the motor 2 is brought to rest with the table exactly 235.164" from the predetermined initial position.

Assuming in the example described in the foregoing that the table 1 travels 235.164" from the initial position, the 1,000-speed device 15 rotated 235.164 times and the 100-speed device rotated 23.5164 times. It will be recalled however that the total rotation from an initial position of each of the corresponding rotary induction devices 11 and 10 respectively in the director was less than one complete turn.

If desired, a static card reader such as shown in Fig. 8 may be utilized instead of the moving card reader illustrated in Fig. 2. Since in this type of reader the card remains stationary during the reading operation, it is unnecessary to store its numerical data in intermediate storage devices as in the system of Figs. 1 and 2. In other words, the stepping switches 82 of which there is one for each significant decimal column in the system of Figs. 1 and 2 may be eliminated. The static card reader comprises a plurality of column contact bars, one for each decimal column of the tabulating card. The bar 117 may be assumed to be the bar for the hundreds column and is connected by means of a conductor 118 to the upper terminal of the hundreds ratchet lever magnet 98 of Fig. 2. The remaining significant decimal column bars will be connected in ratchet lever magnet operating coil circuits of the tens, units, tenths, hundredths and thousandths ratchet wheel assemblies of the Fig. 2 modification. Also included in the static card reader of Fig. 8 is a digit row bus assembly which comprises a plurality of conductors 119, one for each of the digital rows 0–9 and each having a plurality of brushes one for each of the column bars. These conductors are directly connected to corresponding stationary digital contacts 0:9 of the pulse distributor switch 99 of the Fig. 2 modification.

To understand the operation of the modified system utilizing the static card reader of Fig. 8, assume that a hole is punched in the digit 2 row of the hundreds column of the card 75. When the card is moved into its stationary reading position, a brush of the digit 2 row makes contact with the hundreds column bar 117. As the wiper contact 99a of the pulse distributor switch engages its stationary digit 2 contact on the counterclockwise return swing of shaft 87, a circuit is completed for the operating coil of the hundreds lever magnet 98 which is traced from the positive supply conductor 84 through cam switch operated contacts 100, wiper contact 99a and stationary digital contact 7 of the pulse distributor switch, digit 2 row conductor 119 of the card reader, brush through hole in card in contact with hundreds column bar 117, operating coil 98a to the negative supply conductor 85. In response to energization, the ratchet lever magnet 98 actuates its lever into engagement with the digit 2 tooth of the ratchet wheel 96 of the hundreds assembly on the return portion of its oscillative excursion stopping it in its digit 2 position and also stopping the corresponding 1-speed rotary induction device 8 of the director in a position 72° from its initial position. In a similar manner, each of the remaining decimal column ratchet wheels and its corresponding rotary induction device in the director are rotated into positions corresponding to the digital row in which a hole is punched in its column of the tabulating card 75. The remainder of the operation is similar to the previously described operation of the modification illustrated in Figs. 1 and 2.

A different form of stationary card which also makes it possible to eliminate stepping switches of the Figs. 1 and 2 modification is illustrated in Fig. 9. It comprises an upper pinbox 120 and a lower pinbox 121 on which are mounted a plurality of columns of pins (one column for each significant decimal column of the card) arranged in digital rows 0–9. In the upper pinbox are mounted a plurality of switches 122, one for each pin in the lower pinbox and similarly arranged in decimal columns and digital rows. Connections are made from one contact of the digital switches in each decimal column to corresponding digital contacts of the pulse distributor switch 99 of the modification illustrated in Figs. 1 and 2. Such connections are made by separate electrical conductors. Assuming the digital switches 122 to be the switches of the hundreds column, the other contact of each switch in the column is connected by means of a common conductor 123 to the operating coil 98a of the hundreds column ratchet lever 98 of the Figs. 1 and 2 modification.

For each card feed cycle, one card is removed from between the pinboxes and another from the bottom of the supply pile is inserted. Pins in the lower pin box rise through holes in the punched tabulating card and close corresponding switches in the upper pin box. The pin-operated switch in each decimal column prepares a circuit for the operating coil of the ratchet lever magnet for such column, for example, assume the digit 2 switch in the hundreds decimal column closed by a pin projecting through a corresponding hole in the card 75. A circuit for the operating coil 98a of the hundreds column magnet is prepared and is completed on the counterclockwise return swing of the shaft 87 as wiper contact 99a engages its digit 2 stationary contact. The ratchet wheel 96 and its corresponding rotary induction device 8 in the director are actuated to their digit 2 positions. The remainder of the operation of the modified system utilizing the card reader of Fig. 9 is the same as the operation of the system of Figs. 1 and 2 already described.

The intermediate storage means of Figs. 1 and 2 may be eliminated and the moving card reader retained if desired by synchronizing the passage of the card 75 through its successive digital row reading stations with the oscillating movements of the ratchet wheel assemblies through their 0–9 digital positions as illustrated in Fig. 10. In this figure, elements which are the same as corresponding elements in the modification disclosed in Figs.

1 and 2 bear the same reference characters. As shown in Fig. 10, the transport rolls 125 and 126 and the contact roll 79 of the card reader are interconnected by suitable gearing and are driven by means of a direct mechanical connection to the output shaft of the single revolution clutch 90 to which the decimal column ratchet wheel assemblies 94, 95, etc. are connected for oscillation as set forth in the previous description. In the Fig. 10 modification, the oscillation of the ratchet wheel assemblies is accomplished by the cam 89 which is mounted on the output shaft of the clutch, and the combined cam follower and gear sector 127 of which the gear sector portion meshes with the pinion gear 93 on the main oscillating shaft 87 of the ratchet wheel assemblies. The ratio between the gear 93 and the gear sector 127 is such that the return or counterclockwise rotation of the center shaft 87, the oscillating pins 94a, 95a, etc. and the ratchet wheels is coextensive as well as synchronous with the movement of the card 75 past the reading brushes, i. e. there must be one tooth movement of each of the ratchet wheels simultaneously with the movement of each digit row of the card past the reading brushes. In other words, while the ratchet wheels are rotating through arcs subtended by ten teeth, ten digit rows of the card must pass the brushes in synchronism with the ratchet wheels rotation. In order that the card reading circuits i. e. the circuit through the operating coils of the ratchet lever magnets shall not be made or broken through the brushes in the card reader, the pulse timing circuit breaker 81 on the main shaft completes the reading circuits after the brushes have made contact with the conducting surface of the contact row circuit and interrupts them before the brushes become disengaged from such roll.

In operation, when the oscillating pins 94a, 95a attain their extreme clockwise positions the zero digit row of the card 75 is just short of the reading brushes. During the counterclockwise rotation of the ratchet wheels, a new tooth of each wheel moves into position near the ratchet stop lever each time a new digit row of the card moves into the brush position. When a circuit for a digit is completed through a hole in a decimal column of the card, the ratchet lever magnet which is energized, advances its ratchet lever into the path of the teeth of the ratchet wheel and stops the wheel in an angular position which is equal to the product of such digit and 30°. The operation of the modified system of Fig. 10 is in other respects the same as the operation of the modification of Figs. 1 and 2 which is described in the foregoing specification.

To prevent initiating an operating cycle of the controlled machine before the controlled parts are in the correct position, means are provided for preventing the initiation of an operating cycle until after the rotary induction devices of the position indicator are in correspondence with their counterparts in the director. This means is illustrated in Fig. 1 as an error-detecting circuit. Briefly, it comprises a relay or relays having contacts in a circuit which must be closed (or opened) to permit initiation of an operating cycle of the controlled machine together with an electronic unit which is responsive to any error of the system, i. e., angular disagreement of the rotary induction devices of the director and those of the position indicator for controlling the energization of such relay.

The electronic unit is illustrated as comprising a twin triode electric valve 129 which is preferably a 6SN7GT high vacuum valve. It has anodes 129a and 129b, cathodes 129c and 129d and control electrodes 129e and 129f. The anode-cathode circuits are supplied from a suitable source of direct voltage such as represented by the supply conductors 59 and 60 which, as previously stated, are respectively three-hundred volts positive and one-hundred volts positive with respect to the voltage of the grounded voltage supply conductor 61. In the anode circuit of the left hand conducting path of the valve is connected the operating coil 130a of a relay 130 having normally open contacts.

Included in the anode-cathode circuit of the right hand conducting path of valve 129 is the operating coil 131a of a relay 131 which has normally closed contacts. Connected across the supply conductors 59 and 61 is a voltage divider which comprises resistors 132, 133 and 134 connected in series relationship. The control electrode 129e of the left hand conducting path of the valve is connected through a resistor 135 to an intermediate point 132a on the voltage divider which may be assumed to have a voltage of 100 volts positive with respect to ground. Similarly, the control electrode 129f of the right hand conducting path of the valve is connected through a resistor 136 to an intermediate point 133a on the voltage divider and the voltage at this point may be assumed to be 90 volts positive with respect to ground. The intermediate point 132a of the voltage divider is connected to the output terminal 63a of the cathode follower.

In the condition of correspondence of the system, i. e., zero error, the voltage of the cathode follower output terminal 63a has a value which for the purposes of explanation may be assumed to be 100 volts positive with respect to ground. Consequently, the voltage of control electrode 129e of the left hand conducting path is 100 volts and the voltage of control electrode 129f in the right hand conducting path 90 volts. As a result, the left hand path is conducting sufficient current to pick up the relay 130 and close its normally open contacts whereas the current in the right hand conducting path is below the drop out value of relay 131 and its normally closed contacts are therefore closed. With the contacts of both relays closed, a control circuit is completed which permits initiation of an operating cycle of the controlled machine.

If there is any error in the system, i. e. any angular disagreement between the rotary induction devices in the director and those in the position indicator, the contacts of one or the other of relays 130 and 131 are open and the operating cycle of the controlled machine cannot be initiated. For example, if the angular disagreement is in such direction that the cathode follower output terminal becomes more positive than 100 volts, the voltage of intermediate point 133a is sufficiently positive to increase the current in the right path to the pick up value of relay 131 thereby opening its contacts to interrupt the initiating circuit. Similarly, if the error is in the opposite direction, the voltage at terminal 63a is less than 100 volts and the voltage of control electrode 129e decreases to a value at which current in the left hand conducting path of the valve is reduced below the drop-out value of relay 130 which thereupon opens its contacts and interrupts the initiating circuit.

To insure against the initiation of an operating cycle of the controlled machine while even the slightest error exists in the system, means are provided for making the error-detecting circuits slow to indicate correspondence and fast to indicate error. This result is achieved by provision of a capacitor 137 between the cathode 129c and the control electrode 129e of the left hand conducting path of the valve and a similar capacitor 138 between the cathode 129d and the control electrode 129f of the right hand conducting path of the valve. The capacitor 137 together with resistor 135 constitutes a time delay circuit in which the resistor limits the charging rate of the capacitor and thus delays the rise of voltage of the control electrode 129e in response to an increase in voltage at cathode follower terminal 63a. In parallel with resistor 135 is connected a rectifier 139 which is poled to provide a bypass discharge path around the resistor thereby to permit rapid discharge of the capacitor in response to decrease in the voltage of the cathode follower terminal 63a.

Similarly, a rectifier 140 is connected in parallel with resistor 136. The resistor limits the rate of discharge of capacitor 138 in response to a decrease in voltage of the cathode follower terminal 63a where as the rectifier 140 provides a bypass charging path around the resistor to provide rapid charging of the capacitor 138 in response to an increase in voltage at the terminal 63a.

If the system is out of correspondence in such a direction that the voltage at cathode follower terminal 63a is less than 100 volts, the voltage at terminal 63a will rise as the system approaches correspondence. However, the resistor 135 limits the rate at which the capacitor 137 can charge and consequently the voltage of control electrode 129e does not reach the value at which the current in the left hand conducting path equals the pick-up value of relay 130 until after the system has come into correspondence. Similarly, if the error is in the opposite direction, the voltage at cathode follower terminal 63a exceeds 100 volts and the capacitor 137 and 138 will be charged to corresponding voltages. As the error decreases and the system approaches correspondence, the voltage at terminal 63a decreases and the capacitor 138 discharges thereby rendering the voltage at control electrode 129f increasingly negative. However, the resistor 136 limits the rate of discharge of the capacitor 136 and consequently, the voltage of the control electrode 129f does not decrease to the value at which the current of the right hand conducting path decreases to the drop out value of the relay 131 until after the system is in correspondence. Thus, the error detecting circuit is slow to detect the condition of correspondence and thereby prevents completion of the circuit which initiates the operating cycle of the machine until correspondence has been reached and all its parts are in correct position.

On the other hand, if the system is in correspondence and an error suddenly develops in a direction to increase the voltage at the cathode follower terminal 63a, the capacitor 138 is charged through the bypass circuit which includes the rectifier 140 and therefore the rate of charge of the capacitor 138 is not limited by the resistor 136. Consequently, the voltage at the control electrode 129f rises rapidly so that the current in the right hand conducting path is rapidly increased to the pickup value of relay 131 thereby causing it to open its contacts. Similarly, if an error develops in the opposite direction and the voltage of the terminal 63a decreases, the capacitor 137 can discharge through the bypass circuit which includes the rectifier 139 and thus the rate of discharge is not limited by the resistor 135. Consequently, the voltage of the control electrode 129e decreases rapidly to the value at which the current in the left hand conducting path of the valve equals the drop-out value of relay 130. As a result, the relay 130 opens its contacts and interrupts the initiating circuit. Thus the error detecting circuit is fast to detect error or angular disagreement between the rotary induction devices in the director and those in the position indicator.

Although in accordance with the provisions of the patent statutes, this invention is described as embodied in concrete form and the principle thereof has been explained with the best method in which it is now contemplated applying that principle, it will be understood that the apparatus shown and described is merely illustrative and that the invention is not limited thereto since alterations and modifications will readily suggest themselves to those skilled in the art without departing from the true spirit of this invention or from the scope of the annexed claims.

What we claim as new and desire to secure by Letters Patent of the United States is:

1. In combination, an electric motor, a data storage medium reader having a plurality of sensing elements for detecting digital indicia on a digital data storage medium, a director comprising a plurality of induction devices each having relatively movable primary and secondary windings, means responsive to said sensing elements for positioning one of said windings of each of said induction devices in positions corresponding to the numerical value represented by said indicia, a position indicator comprising a plurality of induction devices each corresponding to an induction device in said director and each having a movably mounted winding mechanically connected to be driven by said motor and an inductively related winding, and means responsive to positional disagreement between the movably mounted windings of the induction devices of said director and the movably mounted windings of corresponding induction devices of said position indicator for controlling the energization of said motor to cause it to rotate and stop with its shaft in a position of total angular rotation from an initial reference position corresponding to said numerical value of said digital indicia.

2. In combination, an electric motor, a data storage medium reader having a plurality of sensing elements for detecting digital indicia on a digital data storage medium, a director comprising a plurality of induction devices each having relatively movable members provided with primary and secondary windings, means responsive to said sensing elements for relatively positioning said members in positions corresponding to the numerical value represented by said indicia, a position indicator comprising a plurality of induction devices each having relatively movable members provided with primary and secondary windings each electrically connected to a corresponding induction device in said director, mechanical driving connections between the induction devices of said position indicator and said motor having graduated ratios related to each other in order by successive powers of ten, and means responsive to positional disagreement of the induction devices of said director and corresponding induction devices of said position indicator for controlling the energization of said motor to cause it to rotate and stop with its shaft in a position of total angular rotation from a reference position proportional to the numerical value represented by said digital indicia.

3. In combination, an electric motor, a data storage medium reader having a plurality of sensing elements for detecting digital indicia on a digital data storage medium, a director comprising a plurality of induction devices each having relatively movable members provided with primary and secondary windings, means responsive to said sensing elements for relatively positioning said members in positions corresponding to the numerical value represented by said indicia, a position indicator comprising a plurality of induction devices each corresponding to a different induction device in said director and each having relatively movable members provided with primary and secondary windings, electrical connections between each induction device in said position indicator and its corresponding induction device in said director and mechanical driving connections between each induction device in said position indicator and said motor having ratios progressively differing from each other by successive powers of ten thereby to provide a plurality of different speed control systems for said motor, each comprising an induction device of said director and the corresponding induction device of said position indicator, means responsive to positional disagreement of the induction devices of each of said control systems for controlling the energization of said motor to cause it to rotate and to stop with its shaft in a position of total angular rotation from an initial position proportional to the numerical value of said digital indicia and means for transferring control of said motor from one to another of said control systems in the order of their speed ratios comprising a network array of linear and non-linear resistors electrically connected between said position indicator and said angular disagreement responsive means.

4. In combination, an electric motor, a data storage medium reader having a plurality of sensing elements for detecting digital indicaia on a digital data storage medium, a director comprising a plurality of induction devices each having a movable member and a stator member, primary and secondary windings mounted on said members, means responsive to said sensing elements for positioning said movable members in positions corresponding to the numerical value represented by said indicia, a position indicator comprising a plurality of induction devices each corresponding to a different induction device in said director and each having a movable member and a stator member provided with primary and secondary windings, electrical connections between each induction device in said position indicator and its corresponding induction device in said director and mechanical driving connections between the movable members of said induction devices in said position indicator and said motor having ratios progressively differing from each other, thereby to provide a plurality of different speed control systems for said motor each comprising an induction device of said director and the corresponding induction device of said position indicator, means responsive to angular disagreement of the induction devices of each of said control systems for controlling the energization of said motor to effect rotation and stopping with its shaft in a position of total angular rotation from an initial position proportional to the numerical value of said digital indicia, and means for transferring control of said motor from one of said control systems to another in the order of their speed ratios comprising a network having a voltage divider consisting of alternate linear and non-linear resistors, connections from a rotary induction device of each of said control systems to separated points on said divider, a second voltage divider connected in parallel with said first divider and comprising a plurality of linear resistors, connections including linear and non-linear resistors from intermediate points of said first divider to corresponding intermediate points of said second divider and output connections from said network to said positional disagreement responsive means.

5. In combination, an electric motor, a data storage medium reader having a plurality of sensing elements for detecting digital indicia on a digital data storage medium, a director comprising a plurality of induction devices each having a movable member and a stator member provided with inductively related windings, means responsive to said sensing elements for positioning said movable members in positions corresponding to the numerical value represented by said indicia, a position indicator comprising a plurality of induction devices each corresponding to a different induction device in said director and each having primary and secondary windings, electrical connections between each induction device in said position indicator and its corresponding induction device in said director, mechanical driving connections between each induction device in said position indicator and said motor having ratios progressively differing from each other by successive powers of ten thereby to provide a plurality of different speed control systems for said motor each comprising a different induction device of said director and the corresponding induction device of said position indicator, means responsive to positional disagreement of the induction devices of each of said control systems for controlling the energization of said motor to effect rotation and stopping thereof with its shaft in a position of total angular rotation from an initial position proportional to the numerical value of said digital indicia, and means for transferring control of said motor from each of said control systems to the next in the order of their speed ratios comprising a network having a common input and output terminal, a first voltage divider comprising alternate linear and non-linear resistors, connections from a terminal of an induction device of each of said systems to said common terminal and from the opposite terminals of said last mentioned induction devices to separated points on said first divider, a second voltage divider connected in a circuit in parallel with said first divider and comprising a plurality of linear resistors, a connection including a non-linear resistor and a linear resistor from said common terminal to a point on said first divider, connections including linear resistors from said common terminal to intermediate points of said second divider, bridging connections including linear and non-linear resistors from points of said first divider to corresponding points of said second divider, an output terminal at the junction point of said second divider and one of said bridging connections and connections from said output terminals to said positional disagreement responsive means.

6. In combination, a data storage medium reading device having a plurality of sensing elements actuatable to detect digital indicia in selected locations of a digital data storage medium, a plurality of control transformers each corresponding to a different denominational order of the storage medium and each having a stationary member and a relatively movable member, means responsive to actuation of said sensing elements for positioning said movable members in positions corresponding to the numerical value of said selected digital locations, and a continuous feedback connection from a transformer of a lower denominational order to a transformer of a higher denominational order, said feedback connection having a ratio related to the ratio of said denominational orders.

7. In combination, a data storage medium reader having a plurality of devices actuable to detect indicia in selected locations on a digital data storage medium, a plurality of rotary electrical devices each corresponding to a different denominational order of the storage medium and each having a rotor member and a stator member, driving means for said rotary electrical devices, means responsive to actuation of said detecting devices for causing said driving means to drive said rotor members to positions with respect to their stator members having predetermined relationships to the numerical value represented by said digital locations, and a continuous feedback connection including differential means from a rotary device of a lower denominational order to a rotary electrical device of a higher denominational order, said connection having a ratio related to the ratio of said denominational orders.

8. In combination, a data storage medium reader having a plurality of devices actuable to detect indicia in selected digital locations on a digital data storage medium, a plurality of rotary electrical devices each corresponding to a different denominational order of the storage medium and each having a rotor member and a stator member, driving means for said rotary electrical devices, means responsive to actuation of said detecting devices for causing said driving means to position said rotor members and their stator members in initial relative positions and to effect relative movement thereof from said initial positions in amounts having predetermined relationships to said digital locations, and a continuous feedback connection including a mechanical differential device from a rotary electrical device of a lower denominational order to a rotary electrical device of a higher denominational order, said feedback connection having a driving ratio related to the ratio of said denominational orders.

9. In combination, a data storage medium reader having a plurality of devices actuable to detect indicia in selected digital locations on a digital storage medium, a plurality of rotary electrical devices each corresponding to a different denominational order of the storage medium and each having a rotor member and a stator member, driving means for said rotors, means responsive to actuation of said detecting devices for maintaining each of said rotor members coupled to said driving means for selected individual amounts of rotation having a predetermined relationship to the numerical value represented by said selected digital locations, and a mechanical feedback driving connection including mechanical differential means between a rotary electrical device of a lower denominational order and a rotary electrical device of a higher denominational order, said feedback connection having a driving ratio related to the ratio of said denominational orders.

10. In combination, a data storage medium reader having a plurality of devices actuable to detect indicia in selected digital locations on a digital data storage medium, a plurality of rotary electrical devices each having a rotor member and a stator member, driving means having a driving member oscillatable through a range of forward and reverse movements and connected to said rotary electrical devices to position all of said rotor members in initial positions with respect to their stator members in response to said forward movement, and means responsive to actuation of said detecting devices for disconnecting said rotary devices from said driving member during its reverse movement in response to selected amounts of relative movement of said rotor members and their stator members from said initial positions having predetermined relationships to the numerical value represented by said selected digital locations.

11. In combination, a data storage medium reader having a plurality of devices actuable to detect indicia in selected digital locations on a digital data storage medium, a plurality of rotary induction devices each having a rotor member and a stator member, driving means having a driving member oscillatable through a range of forward and reverse movements and connected to drive all said rotor members to corresponding initial positions with respect to their stator members in response to said forward movement, and means responsive to actuation of said detecting devices for disconnecting said rotor members from said driving member during its reverse movement at the ends of selected amounts of rotation from said initial positions having predetermined relationships to the numerical value represented by said digital locations.

12. In combination, a data storage medium reader having a plurality of devices actuable to detect indicia recorded in selected digital locations of selected decimal columns of a digital data storage medium, a plurality of rotary induction devices each having a stator member and a rotor member, driving means for said rotor members having a driving member oscillatable through a predetermined range of forward and reverse movements for rotating all of said rotor members to initial positions with respect to their stator members in response to said forward movement, spring means for biasing said rotor members for rotation in the reverse direction in response to said reverse movement of said driving member, and a plurality of stop members, one for each of said rotor members selectively presettable in response to actuation of said detecting devices into positions for stopping said rotor members on said reverse movement in positions having predetermined relationships to the numerical value of said selected digital locations.

13. In combination, a data storage medium reader having a plurality of devices actuable to detect indicia recorded in selected digital locations in selected decimal columns of a digital data storage medium, a plurality of rotary electrical devices each having a stator member and a rotor member, driving means having a driving member oscillatable through a predetermined range of forward and reverse movements and connected to drive all of said rotor members to corresponding initial positions with respect to their stator members, spring means for biasing said rotor members for reverse rotation in response to said reverse movement of said driving member, a plurality of stop members for said rotor members and means responsive to said actuation of said detecting devices for causing said stop members to stop said rotor members during said reverse movement of said driving member at the ends of amounts of rotation of said rotor members from said initial positions having predetermined relationships to said selected digital locations.

14. In combination, a data storage medium reader having a plurality of decimal columns divided into digital rows of contacts for completing circuits through holes in selected digital locations in selected decimal columns of a digital data storage medium, a plurality of rotary electrical devices each having a rotor member and a stator member, and means responsive to said completion of said circuits for positioning said rotor members with respect to their stator members in positions corresponding to the numerical value represented by said selected digital locations.

15. In combination, a data storage medium reader having a plurality of decimal columns divided into digital rows of contacts for completing circuits through holes in selected digital locations in selected decimal columns of a digital data storage medium, a plurality of rotary electrical devices each having a rotor member and a stator member, driving means for said rotor members and a plurality of electromagnetic stepping switches, one for each of said decimal columns, responsive to said completed circuits for controlling said driving means to position said rotor members in relative angular positions with respect to their stator members having predetermined relationships to the numerical value represented by said selected digital locations.

16. In combination, a data storage medium reading device having a plurality of decimal columns divided into digital rows of contacts for completing circuits through holes in selected digital locations in selected decimal columns of a digital data storage medium, a plurality of rotary induction devices each having a stator member and a rotor member, driving means for said rotor members having a driving member oscillatable through a predetermined range of forward and reverse movements and connected to drive all said rotor members to corresponding initial positions in response to said forward movement and means responsive to completion of said circuits for disconnecting said rotor members from said driving member during its reverse movement at the ends of selected amounts of rotation from said initial positions having predetermined relationships to the numerical value represented by said digital locations.

17. In combination, a data storage medium reading device having a plurality of decimal columns divided into digital rows of contacts for completing circuits through holes in selected digital locations in selected decimal columns of a digital data storage medium, a plurality of rotary electrical devices each having a stator member and a rotor member, driving means for said rotor members having a driving member oscillatable through a predetermined range of forward and reverse movements and connected to drive all said rotor members to corresponding initial positions in response to said forward movement, means for biasing said rotor members for rotation in the reverse direction in response to said reverse movement of said driving member, a plurality of stop members, one for each of said rotor members, and means responsive to completion of said circuits for setting said stop members in predetermined positions to stop said rotor members during said reverse movement of said driving member at the ends of amounts of rotation from said initial positions having predetermined relationships to the numerical value of said selected digital locations.

18. In combination, a data storage medium reading device having a plurality of decimal columns divided into digital rows of contacts for completing circuits through holes in selected digital locations in selected decimal columns of a digital data storage medium, a plurality of rotary induction devices each having a stator member and a rotor member, driving means for said rotor members having a driving member oscillatable through a predetermined range of forward and reverse movements and connected to drive all said rotor members to corresponding initial positions in response to said forward movement, spring means for biasing said rotor members for rotation in the reverse direction in response to said reverse movement of said driving member, a plurality of stop members for said rotor members, a plurality of electromagnetic stepping switches, one for each of said decimal columns, responsive to said completed circuits for setting said stop members in predetermined positions to stop said rotor members during said reverse movement of said driving member in angular positions with respect to said initial positions having predetermined relationships to the numerical value represented by said selected digital locations.

19. In combination, a data storage medium reading device having a plurality of decimal columns divided into digital rows of contacts for completing circuits through holes in selected digital locations in selected decimal columns of a digital data storage medium, a plurality of rotary induction devices each having a stator member and a rotor member, driving means for said rotor members having a driving member oscillatable through a predetermined range of forward and reverse movements and connected to drive all said rotor members to corresponding initial positions in response to said forward movement and electromagnetically actuated ratcheting devices responsive to said completion of said circuits for positioning said rotor members with respect to their stator members in positions corresponding to the numerical value represented by said selected digital locations.

20. In combination, a data storage medium reading device having a plurality of decimal columns divided into digital rows of contacts for completing circuits through holes in selected digital locations in selected decimal columns of a digital data storage medium, a plurality of rotary electrical devices each having a stator member and a rotor member, driving means for said rotor members having a driving member oscillatable through a predetermined range of forward and reverse movements and connected to drive all said rotor members to corresponding initial positions in response to said forward movement, spring means for biasing said rotor members for rotation in the reverse direction in response to said reverse movement of said driving member, a plurality of stop members for said rotor members, a plurality of electromagnetic stepping switches, one for each of said decimal columns responsive to said completion of said circuits and electromagnetically actuated ratcheting devices controlled thereby for setting said stop members in positions to stop said rotor members during said reverse movement of said driving member in angular positions with respect to said initial positions having predetermined relationship to the numerical value of said selected digital locations in said selected decimal columns.

21. In combination, a data storage medium reader having a plurality of sensing elements for detecting indicia in selected locations on a digital data storage medium, a plurality of rotary induction devices each corresponding to a different one of said decimal order columns and each having a rotor member and a stator member, differential gearing between rotary induction devices of successive decimal orders for adding to the rotation of each rotary induction device, a predetermined fraction of the rotation of the next lower decimal order device, and means responsive to actuation of said detecting devices for positioning said rotor members in positions corresponding to the numerical value of said selected digits.

22. In combination, a data storage medium reader having a plurality of devices actuable to detect digital indicia in selected digital locations in selected decimal columns of a digital data storage medium, a plurality of rotary induction devices each corresponding to a different one of said decimal order columns, and each having a rotor member and a stator member, driving means for said rotary induction devices, differential gearing of predetermined ratios between rotary induction devices of successive decimal orders for adding to the rotation of each of said rotary induction devices, a predetermined fraction of the rotation of the rotary induction device of next lower decimal order, and means responsive to actuation of said detecting devices for causing said driving means to drive said rotor members to positions with respect to their stator members having predetermined relationships to the numerical value represented by said digital locations.

23. In combination, a data storage medium reader having a plurality of devices actuable to detect indicia in selected digital locations of selected order columns on a digital data storage medium, a plurality of rotary induction devices each corresponding to a different one of said decimal order columns and each having a rotor member and a stator member, driving means for said rotary induction devices having a driving member oscillatable through a range of forward and reverse movements and connected to said rotary induction devices to position all of said rotor members in initial positions with respect to their stator members in response to said forward movement, differential gearing between rotary induction devices of successive decimal orders for adding to the rotation of each rotary induction device one tenth the rotation of the next lower decimal order device and means responsive to actuation of said detecting devices for disconnecting said rotary induction devices from said driving member during its reverse movement at the ends of selected amounts of rotation of said rotor members from said initial positions having predetermined relationships to the numerical value represented by said selected digital locations.

24. In combination, a data storage medium reader having a plurality of successive decimal order columns divided into digital rows of individual contact devices for completing circuits through holes in selected digital locations in selected decimal columns on a digital data storage medium, a plurality of rotary induction devices each corresponding to a different one of said decimal order columns and each having a rotor member and a stator member, a driving means for said rotary induction devices having a driving member oscillatable through a range of forward and reverse movements and connected to said rotary induction devices to position all of said rotor members in initial positions with respect to their stator members in response to said forward movement of said driving member differential gearing between rotary inductive devices of successive decimal orders for adding to the rotation of each rotary induction device a predetermined fraction of the rotation of the next lower decimal order rotary induction device, spring means for biasing said rotor members for rotation in the reverse direction in response to said reverse movement of said driving member, a plurality of stop members for said rotor members and a plurality of electromagnetic ratcheting devices responsive to said completion of said circuits for setting said stop members in positions to stop said rotor members during said reverse movement of said driving member in angular positions with respect to said initial positions having predetermined relationships to the numerical value of said selected digital locations in said selected decimal columns.

25. In combination, a data storage medium reader having a plurality of rows of decimal columns divided into digital rows of individual contact devices for preparing circuits through holes in selected digital locations of selected decimal columns on a digital data storage medium, a plurality of rotary induction devices each corresponding to a different one of said columns and each having a rotor member and a stator member driving means having a driving member oscillatable through a predetermined range of forward and reverse movements and connected to said rotary induction devices to position all of said rotor members in initial positions with respect to their stator members in response to said forward movement of said driving member, means for biasing rotor members for rotation in the reverse direction in response to said reverse movement of said driving member, a plurality of stopping devices, one for each of said rotary induction devices and each connected to its rotor member and having a number of teeth equal to said number of digit rows and included within said range of forward and reverse movements, a magnet having an operating coil connected in circuit with the decimal column of contacts to which its rotary induction device corresponds, a distributor switch having a plurality of contacts each connected to a different one of said digital rows of contacts and driven by said oscillatable member successively to actuate its contacts to complete and prepared circuits through said operating coils in each portion of said distributor switch corresponding to one of said selected digital locations thereby to stop said rotor members in angular positions with respect to said initial portions having predetermined relationships to the numerical value represented by said selected digital locations.

26. An indicating circuit comprising a pair of electric valves each having an input circuit provided with connections to a source of variable signal voltage and an output circuit, a separate time element circuit for each of said valves comprising a capacitor connected to its input circuit to be charged by the voltage of said source, a separate current limiting resistor in circuit with each of said capacitors and reversely poled rectifiers connected in parallel with said capacitors to provide for relatively rapid charge of a first of said capacitors and relatively slow charge of the second of said capacitors in response to increasing values of said signal voltage and relatively slow discharge of the first of said capacitors and relatively fast discharge of the second of said capacitors in response to decreasing values of said signal voltage.

27. An indicating circuit comprising an electric valve having an input circuit provided with connections to a source of variable signal voltage and an output circuit, a time element circuit associated with said valve comprising a capacitor connected to said input circuit to be charged by the variable signal voltage and a current limiting resistor included in said connections, an assymmetric conducting device connected in a circuit in parallel with said resistor poled to effect a relatively rapid change in the charge on said capacitor and the voltage supplied to said input circuit in response to a change in the voltage of said source and a relatively slow change in the opposite sense of the charge on said capacitor and the voltage supplied to said input circuit in response to a change of opposite sense of the voltage of said source, and indicating means controlled by said output circuit.

References Cited in the file of this patent

UNITED STATES PATENTS

| | | |
|---|---|---|
| 2,232,006 | Lake | Feb. 18, 1941 |
| 2,475,245 | Leaver et al. | July 5, 1949 |
| 2,502,917 | Beattie | Apr. 4, 1950 |
| 2,537,720 | Livingston et al. | Jan. 9, 1951 |
| 2,560,337 | Fouassin | July 10, 1951 |
| 2,715,703 | Schuck | Aug. 16, 1955 |
| 2,764,720 | Kelling | Sept. 25, 1956 |

OTHER REFERENCES

Digital to Analog Converter, Electronics, October 1952, pp. 127–9.

Punched Tape Guides Milling Machine Cutter, Electronics, pp 135–7.

UNITED STATES PATENT OFFICE
CERTIFICATE OF CORRECTION

Patent No. 2,848,670            August 19, 1958

Leroy U. C. Kelling et al.

It is hereby certified that error appears in the printed specification of the above numbered patent requiring correction and that the said Letters Patent should read as corrected below.

Column 5, line 8, for "direction" read -- director --; column 16, line 66, for "he" read -- the --; column 22, line 72, for "indicaia" read -- indicia --; column 27, line 48, for "relationship" read -- relationships --; line 55, for "rotar" read -- rotor --; column 28, line 45, for "inductive" read -- induction --; column 29, line 5, for "digit" read -- digital --.

Signed and sealed this 2nd day of December 1958.

(SEAL)
Attest:

KARL H. AXLINE            ROBERT C. WATSON
Attesting Officer            Commissioner of Patents